(12) United States Patent
Takeshita

(10) Patent No.: US 7,650,057 B2
(45) Date of Patent: Jan. 19, 2010

(54) BROADCASTING SIGNAL RECEIVING SYSTEM

(75) Inventor: Masahiro Takeshita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 898 days.

(21) Appl. No.: 11/339,314

(22) Filed: Jan. 25, 2006

(65) Prior Publication Data
US 2006/0188234 A1 Aug. 24, 2006

(30) Foreign Application Priority Data
Jan. 25, 2005 (JP) .......................... P2005-017513

(51) Int. Cl.
H04N 5/76 (2006.01)
H04N 7/00 (2006.01)
H04N 5/00 (2006.01)
(52) U.S. Cl. .......................... 386/46; 386/94; 386/117
(58) Field of Classification Search .................. 386/46, 386/94, 117
See application file for complete search history.

(56) References Cited

U.S. PATENT DOCUMENTS

| 5,912,721 | A * | 6/1999 | Yamaguchi et al. ......... 351/210 |
| 6,928,231 | B2 * | 8/2005 | Tajima ......................... 386/46 |
| 7,071,831 | B2 * | 7/2006 | Johns ......................... 340/576 |
| 7,158,657 | B2 * | 1/2007 | Okazaki et al. ............. 382/118 |
| 7,369,951 | B2 * | 5/2008 | Blosser et al. ................ 702/74 |
| 7,466,898 | B2 * | 12/2008 | Ohashi ........................ 386/46 |
| 2003/0108334 | A1 * | 6/2003 | Nevenka et al. ............... 386/95 |
| 2004/0100487 | A1 * | 5/2004 | Mori et al. .................. 345/724 |

FOREIGN PATENT DOCUMENTS

JP 8-18900 1/1996
JP 9-34424 2/1997

OTHER PUBLICATIONS

Patent Abstracts of Japan, Publication No. 08-018900, Publication Date Jan. 19, 1996, 2 pages.
Patent Abstracts of Japan, Publication No. 09-034424, Publication No. Feb. 7, 1997, 2 pages.

* cited by examiner

*Primary Examiner*—Thai Tran
*Assistant Examiner*—Gelek Topgyal
(74) *Attorney, Agent, or Firm*—Osha • Liang LLP

(57) ABSTRACT

When a face image can not detected by an individual authentication unit from an image photographed by a camera unit for a predetermined time or more, a control unit records a recording position of a corresponding time, and makes a receiving program continuously recorded by a recording reproducing unit in a common recording state in which a time shift function becomes invalid such that the face image is detected again by the individual authentication unit from the image photographed from the camera unit. When it is determined that a detected person is the same person as a first person based on a recognition result on the basis of features of the face image, the control unit makes a recorded program return to the recorded position so as to be reproduced while maintaining the common recording state.

13 Claims, 14 Drawing Sheets

BROADCASTING SIGNAL RECEIVING SYSTEM

CROSS-REFERENCE TO RELATED APPLICATIONS

This application is based on and claims the benefit of priority from the prior Japanese Patent Application No. 2005-017513, filed on Jan. 25, 2005; the entire contents of which are incorporated herein by reference.

BACKGROUND OF THE INVENTION

1. Field of the Invention

The present invention relates to a broadcasting signal receiving system having an automatic recording function in which a viewer can watch a program while simultaneously recording the program, that is, a so-called time shift function. More specifically, the present invention relates to a broadcasting signal receiving system that is capable of allowing a viewer to view a missed program by a detection technology that detects whether the viewer is present or seeping.

2. Description of the Related Art

In recent television receivers, each television receiver has a built-in hard disk (HD) serving as a recording medium and a time shift function that can watch missed scenes continuously by watching a program while simultaneously recording the program. However, this time shift function is only a temporary recording function. Specifically, in a case in which the viewer receives a visitor or sleeps while watching a television so that the viewer misses scenes of the corresponding program for a certain time, a first scene of the missed program is already deleted, so that the viewer can view only a portion of the missed scenes of the program even though the recorded program is reproduced.

In the meantime, a counter measure has been suggested for a case in which the viewer leaves the front of the television or sleeps while watching the television.

For example, a television receiver having the following structure has been suggested (for example, see JP-A-8-18900). According to the structure of the television receiver, if it is detected by a detection device having an infrared camera or an image recognition processing unit that the viewer does not exist in front of the television receiver, a recording reproducing device is operated so as to start recording. If it is detected that the viewer is in front of the television receiver again, the recording reproducing device is stopped, and the recorded program is reproduced from a recording starting position of the recorded program.

In addition, a display system having the following structure has been suggested (for example, see JP-A-9-34424). According to the structure of the display system, the television receiver has an awakened degree detecting unit that detects an awakened degree of a viewer. If it is determined by the awakened degree detecting unit whether the viewer enters a sleeping state, a recording unit is operated, and the television receiver is turned off. In this display system, the awakened degree detecting unit irradiates ultraviolet rays onto the face of the viewer photographed by an image pickup unit, so that a retina reflecting image is observed, thereby determining whether the viewer is sleeping.

SUMMARY OF THE INVENTION

As such, various technologies have already been suggested in which a camera or an image processing device is provided in a television receiver such that a viewer can be recognized, the television receiver is turned off or a time shift function is operated in accordance with the recognition result.

In the meantime, the television receiver is provided in a general home. In the general home, many people including a father, a mother, a sister, a brother or the like watch the same television receiver at the same time or at different times. Therefore, in order to achieve the function disclosed in JP-A-8-18900 and JP-A-9-34424, each individual person should be specified. However, according to the technologies disclosed in Patent Documents 1 and 2, it is not taken into consideration that each individual person should be specified. Therefore, it is not possible to differentiate between each individual person having different personal characteristics.

For this reason, according to JP-A-8-18900, in a case in which the father has a thing to do while watching the television and thus leaves an area where the television is located, the fact that the viewer leaves the front of the television receiver is detected, the recording reproducing device is operated so as to start recording. In this state, when the mother returns to the front of the television receiver, the recording reproducing device is stopped, so that a corresponding program is reproduced from a recording starting position. As a result, in the mother' place, scenes of the program which the mother does not intend abruptly start. In addition, the scenes of the program which the father does not watch have already started, and scenes of the broadcasting program corresponding to a time between a time when the reproduction starts and a time when the father returns to the front of the television receiver are not recorded. Therefore, since all the missed scenes cannot be reproduced, the father may feel confusion.

The present invention has been made in view of the above circumstances and provides a broadcasting signal receiving system which is capable of allowing a viewer to view a missed program by combining with each other a time shift function, a detection technology that detects whether the viewer is present or is sleeping, and an individual authentication technology.

In order to achieve the above-mentioned object, a broadcasting signal receiving system according to an aspect of the invention includes a broadcasting signal receiving unit that receives a program broadcasting signal so as to obtain a video signal and an audio signal; an image pickup unit that photographs a viewer; a face image detecting unit that detects a face image from a photographed image of the viewer photographed by the image pickup unit; an authentication unit that compares the face image of the viewer detected by the face image detecting unit with a face image of each individual person registered in advance so as to authenticate the corresponding viewer; a recording reproducing unit that records a received broadcasting signal so as to store the received broadcasting signal; a recording reproducing control unit that has a simple recording function for recording a program, which the viewer is viewing, in the recording reproducing unit, and sequentially deletes recorded data in a recorded order whenever a predetermined time lapses. The face image is not detected by the face image detecting unit for a predetermined time or more, the recording reproducing control unit changes an operation mode of the broadcasting signal receiving system from a common mode to a power saving mode at a corresponding time, records a recording position of a corresponding time, and makes the receiving program continuously recorded by the recording reproducing unit in a state in which the simple recording function becomes invalid such that the face image is detected again by the face image detecting unit. When it is determined that the detected person is the same person as the first person based on the recognition result by the recognition unit, the recording reproducing control unit makes the operation mode of the system return to the common mode from the power saving mode at a corresponding time, and makes the recorded program return to the recording position so as to be reproduced while maintaining the common recording state. In the common recording state in which the simple recording function becomes invalid, when the face image is detected again by the face image detecting unit and it is recognized that the detected person is different from the first person based on the recognition result by the recognition unit, the recording reproducing control unit notifies the viewer that automatic recording is being performed, makes operation input by a different person invalid, and displays a warning message indicating that the input is invalid on a screen while maintaining the common recording state.

According to the above-aspect, when the face image is not detected by the face image detecting unit for a predetermined time or more, the recording reproducing control unit records a recording position of a corresponding time, makes the receiving program continuously recorded by the recording reproducing unit in a common recording state such that the face image is detected again by the face image detecting unit, and only when it is determined that the detected person is the same person as a first person based on the recognition result by the recognition unit, the recording reproducing control unit makes the recorded program return to the recording position so as to be reproduced. That is, only when the first person is the same person as the returned person, since the recording reproducing control unit makes the recorded program return to the recording position so as to be reproduced, even though another person returns to the front of the television receiver, it is possible to prevent erroneous reproduction from occurring.

In this case, when the face image is not detected by the face image detecting unit for a predetermined time or more, the recording reproducing control unit changes an operation mode of the broadcasting signal receiving system from a common mode to a power saving mode at a corresponding time, and when the face image is detected by the face image detecting unit, the recording reproducing control unit makes the operation mode of the broadcasting signal receiving system return to the common mode from the power saving mode at a corresponding time.

The broadcasting signal receiving system may further include a notification unit that notifies the viewer that automatic recording is being performed, when the face image is detected again by the face image detecting unit and it is recognized that the detected person is the same person as the first person based on the recognition result by the recognition result in the common recording state in which the simple recording function becomes invalid.

According to the above-aspect, in a common recording state in which the simple recording function becomes invalid, when the face image is detected again by the face image detecting unit and it is recognized that the detected person is different from the first person, based on the recognition result by the recognition unit, the recording reproducing control unit makes operation input by the different person invalid and displays a warning message indicating that the input is invalid on a screen while maintaining the common recording state. By adopting this structure, careless operation by a different person, that is, operation such as stopping automatic recording can be prevented.

According to the above-aspect, a plurality of the broadcasting signal receiving units are provided in the broadcasting signal receiving system. In a common recording state in which the simple recording function becomes invalid, when the face image is detected again by the face image detecting unit and it is recognized that the detected person is different from the first person based on the recognition result by the recognition unit, the recording reproducing control unit makes a broadcasting signal of a program selected by a different person received by another broadcasting signal receiving unit while maintaining the common recording state so as to be watched by the viewer. As such, the plurality of broadcasting signal receiving units are provided in the broadcasting signal receiving system, so that the recording reproducing control may be performed with respect to each of many people who is viewing the television receiver. For example, the recording reproducing control is performed with respect to a father, and control is performed with respect to a mother such that she can view the television receiver while maintaining the recording reproducing control.

A broadcasting signal receiving system according to a second aspect of the invention includes a broadcasting signal receiving unit that receives a program broadcasting signal so as to obtain a video signal and an audio signal; an image pickup unit that photographs a viewer; a face image detecting unit that detects a face image from a photographed image of the viewer photographed by the image pickup unit; an authentication unit that compares the face image of the viewer detected by the face image detecting unit with a face image of each individual person registered in advance so as to authenticate the corresponding viewer; a recording reproducing unit that records a received broadcasting signal so as to store the received broadcasting signal; a recording reproducing control unit that has a simple recording function for recording a program, which the viewer is viewing, in the recording reproducing unit, and sequentially deletes recorded data in a recorded order whenever a predetermined time lapses, and a dynamic subject determining unit that determines whether a dynamic subject exists from the photographed image of the viewer photographed by the image pickup unit. When it is determined by the dynamic subject determining unit that the dynamic subject exists and it is determined by the face image detecting unit that the face image cannot be detected, the recording reproducing control unit makes a receiving program continuously recorded by the recording reproducing unit in the common recording state in which the simple recording function becomes invalid, and notifies the viewer that the recording is being performed in the common recording state.

According to the second-aspect, when a situation, in which the viewer is in front of the television receiver, but since the viewer has a thing to do, the viewer does not view the television receiver continually is determined from the photographed image, not in a power saving mode (that is, in a state in which the television is turned on) but a common recording state in which the simple recording function (time shift function) is invalid, the receiving program is continuously recorded by the recording reproducing unit. In this case, if the message that the recording is being performed is displayed on the screen, the viewer who views this message can determine whether the viewer wants to perform the recording in a current state, and when the normal recording is unnecessary, the viewer releases the normal recording so as to return to the recording having the original simple recording function (time shift function).

A broadcasting signal receiving system according to a third aspect of the invention includes a broadcasting signal receiving unit that receives a program broadcasting signal so as to obtain a video signal and an audio signal; an image pickup unit that photographs a viewer; a face image detecting unit that detects a face image from a photographed image of the viewer photographed by the image pickup unit; an authentication unit that compares the face image of the viewer detected by the face image detecting unit with a face image of each individual person registered in advance so as to authenticate the corresponding viewer; a recording reproducing unit that records a received broadcasting signal so as to store the received broadcasting signal; a recording reproducing control unit that has a simple recording function for recording a program, which the viewer is viewing, in the recording reproducing unit, and sequentially deletes recorded data in a recorded order whenever a predetermined time lapses, and an opened/closed state determining unit that determines whether eyes are opened or closed from the face image detected by the face image detecting unit. When it is determined by the opened/closed state determining unit that the eyes are closed for a predetermined time or more, the recording reproducing control unit records a recording position of a corresponding time, makes a receiving program continuously recorded by the recording reproducing unit in the common recording state in which the simple recording function becomes invalid. In addition, when it is determined by the opened/closed state determining unit that the eyes are opened again, and it is determined that the detected person is the same person as the first person based on the recognized result by the recognition unit, the recording reproducing control unit makes the recorded program return to the recording position so as to be reproduced while maintaining the common recording state.

According to the third-aspect, when it is determined by the opened/closed state determining unit that the eyes are closed for a predetermined time or more, the recording reproducing control unit records a recording position of a corresponding time, and makes a receiving program continuously recorded by the recording reproducing unit in the common recording state. In addition, when it is determined by the opened/closed state determining unit that the eyes are opened again and it is determined that the detected person is the same person as the first person based on the recognized result by the recognition unit, the recording reproducing control unit makes the recorded program return to the recording position so as to be reproduced. That is, when the viewer is sleeping, the program is continually recorded, and when the viewer is wake up, the recorded program returns to the recording position. Therefore, the viewer can make scenes missed when the viewer is sleeping reproduced so as to view the missed scenes.

In this case, when it is determined by the opened/closed state determining unit that the eyes are closed for a predetermined time or more, the recording reproducing control unit changes an operation mode of the broadcasting signal receiving system from a common mode to a power saving mode at a corresponding time, and when it is determined by the opened/closed state determining unit that the eyes are opened again, the recording reproducing control unit makes an operation mode of the broadcasting signal receiving system return to the common mode from the power saving mode at a corresponding time. Thereby, it is possible to suppress the unnecessary power consumption.

According to the above-aspect, the broadcasting signal receiving system may further include a notification unit that notifies the viewer that automatic recording is being recorded, when it is determined that the eyes are opened again by the opened/closed state determining unit and it is recognized that the detected person is different from the first person based on the recognition result by the recognition unit in a common recording state in which the simple recording function becomes invalid. By adopting this structure, careless operation by a different person, that is, operation such as stopping automatic recording can be prevented in advance. For example, when another viewer comes in front of the television in a state in which the first viewer falls fast asleep, the above-mentioned situation is generated. However, according to this aspect, the careless operation by another viewer can be prevented in advance.

According to the above-aspect, in a common recording state in which the simple recording function becomes invalid, when it is determined by the opened/closed state determining unit that the eyes are opened again and it is determined that the detected person is different from the first person based on the recognition result of the recognition unit, the recording reproducing control unit makes operation input by the different person invalid and displays a warning message indicating that the input is invalid on a screen while maintaining the common recording state. By adopting this structure, careless operation by a different person, that is, operation such as stopping automatic recording can be prevented in advance.

According to the above-aspect, a plurality of the broadcasting signal receiving units are provided. In addition, in a common recording state in which the simple recording function becomes invalid, when it is determined by the opened/closed state determining unit that the eyes are opened again and it is recognized that the detected person is different from the first person based on the recognition result by the recognition unit, the recording reproducing control unit makes a broadcasting signal of a program selected by a different person received by another broadcasting signal receiving unit while maintaining the common recording state so as to be watched by the viewer. As such, the plurality of broadcasting signal receiving units are provided in the broadcasting signal receiving system, so that the recording reproducing control may be performed with respect to each of many people who is viewing the television receiver. For example, the recording reproducing control is performed with respect to a father, and control is performed with respect to a mother such that she can view the television receiver while maintaining the recording reproducing control.

A broadcasting signal receiving system according to a fourth aspect of the invention includes a broadcasting signal receiving unit that receives a program broadcasting signal so as to obtain a video signal and an audio signal; an image pickup unit that photographs a viewer; a face image detecting unit that detects a face image from a photographed image of the viewer photographed by the image pickup unit; an authentication unit that compares the face image of the viewer detected by the face image detecting unit with a face image of each individual person registered in advance so as to authenticate the corresponding viewer; a recording reproducing unit that records a received broadcasting signal so as to store the received broadcasting signal; a recording reproducing control unit that has a simple recording function for recording a program, which the viewer is viewing, in the recording reproducing unit, and sequentially deletes recorded data in a recorded order whenever a predetermined time lapses, and an opened/closed state determining unit that determines whether eyes are opened or closed from the face image detected by the face image detecting unit. When it is determined that the face image is detected by the face image detecting unit and it cannot be determined by the opened/closed state detecting unit whether the eyes are opened or closed, the recording reproducing control unit makes a receiving program continuously recorded by the recording reproducing unit in the common recording state in which the simple recording function becomes invalid, and notifies the viewer that the recording is being performed in the common recording state.

According to the fourth-aspect, when a situation, in which the viewer is in front of the television receiver, but since the viewer has a thing to do, the viewer does not view the television receiver continually, is determined from the photographed image, not in a power saving mode (that is, in a state in which the television is turned on) but a common recording state in which the simple recording function (time shift function) becomes invalid, the receiving program is continuously recorded by the recording reproducing unit. In this case, if the message that the recording is being performed is displayed on the screen, the viewer who views this message can determine whether the viewer wants to perform the recording in a current state, and when the normal recording is unnecessary, the viewer releases the normal recording so as to return to the recording having the original simple recording function (time shift function).

According to the above-aspects, when it is determined that the face image cannot be detected for a predetermined time or more or the eyes are closed for a predetermined time, the recording reproducing control unit records a recording position of a corresponding time, makes the receiving program continuously recorded in a common recording state such that the face image is detected again, and only when (it is determined that the eyes are opened again) and the detected person is the same person as a first person based on the recognition result by the recognition unit, the recording reproducing control unit makes the recorded program return to the recording position so as to be reproduced. That is, since it automatically enters a recording state by the face recognition or the recognition of the opened/closed state of the eyes, it is possible to perform not only the temporal recording like the time shift function but also the recording of a part of the program which the viewer has missed. Further, only when the first person is the same person as the returned person, since the recording reproducing control unit makes the recorded program return to the recording position so as to be reproduced, even though another person returns to the front of the television receiver, it is possible to prevent erroneous reproduction from occurring.

According to the above-aspects, the broadcasting signal receiving system may further include a notification unit that notifies the viewer that automatic recording is being performed, when the face image is detected again by the face image detecting unit or the eyes are opened again and it is recognized that the detected person is different from the first person based on the recognition result by the recognition result in the common recording state in which the simple recording function becomes invalid. Therefore, careless operation by a different person, that is, operation such as stopping automatic recording can be prevented in advance.

According to the above-aspects, in a common recording state in which the simple recording function becomes invalid, when the face image is detected again by the face image detecting unit or the eyes are opened again and it is recognized that the detected person is different from the first person based on the recognition result by the recognition unit, the recording reproducing control unit makes operation input by the different person invalid and displays a warning message indicating that the input is invalid on a screen while maintaining the common recording state. Therefore, careless operation by a different person, that is, operation such as stopping automatic recording can be prevented.

According to the above-aspects, a plurality of the broadcasting signal receiving units are provided in the broadcasting signal receiving system. In a common recording state in which the simple recording function becomes invalid, when the face image is detected again by the face image detecting unit or the eyes are opened again and it is recognized that the detected person is different from the first person based on the recognition result by the recognition unit, the recording reproducing control unit makes a broadcasting signal of a program selected by a different person received by another broadcasting signal receiving unit while maintaining the common recording state so as to be watched by the viewer. Therefore, the recording reproducing control and viewing control may be performed with respect to each of many people who are viewing the television receiver or may be simultaneously with respect to all people.

According to the above-aspects, when a situation, in which the viewer is in front of the television receiver, but since the viewer has a thing to do, the viewer does not view the television receiver continually is determined from the photographed image, not in a power saving mode (that is, in a state in which the television is turned on) but a common recording state in which the simple recording function (time shift function) becomes invalid, the receiving program is continuously recorded by the recording reproducing unit. Therefore, it is possible to cope with a situation in which it cannot be determined whether the viewer is viewing the television receiver, that is, a situation in which the viewer may miss the scenes of the program.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

Hereinafter, preferred embodiments of the invention will be described with reference to the accompanying drawings.

First Embodiment

Figure 1:
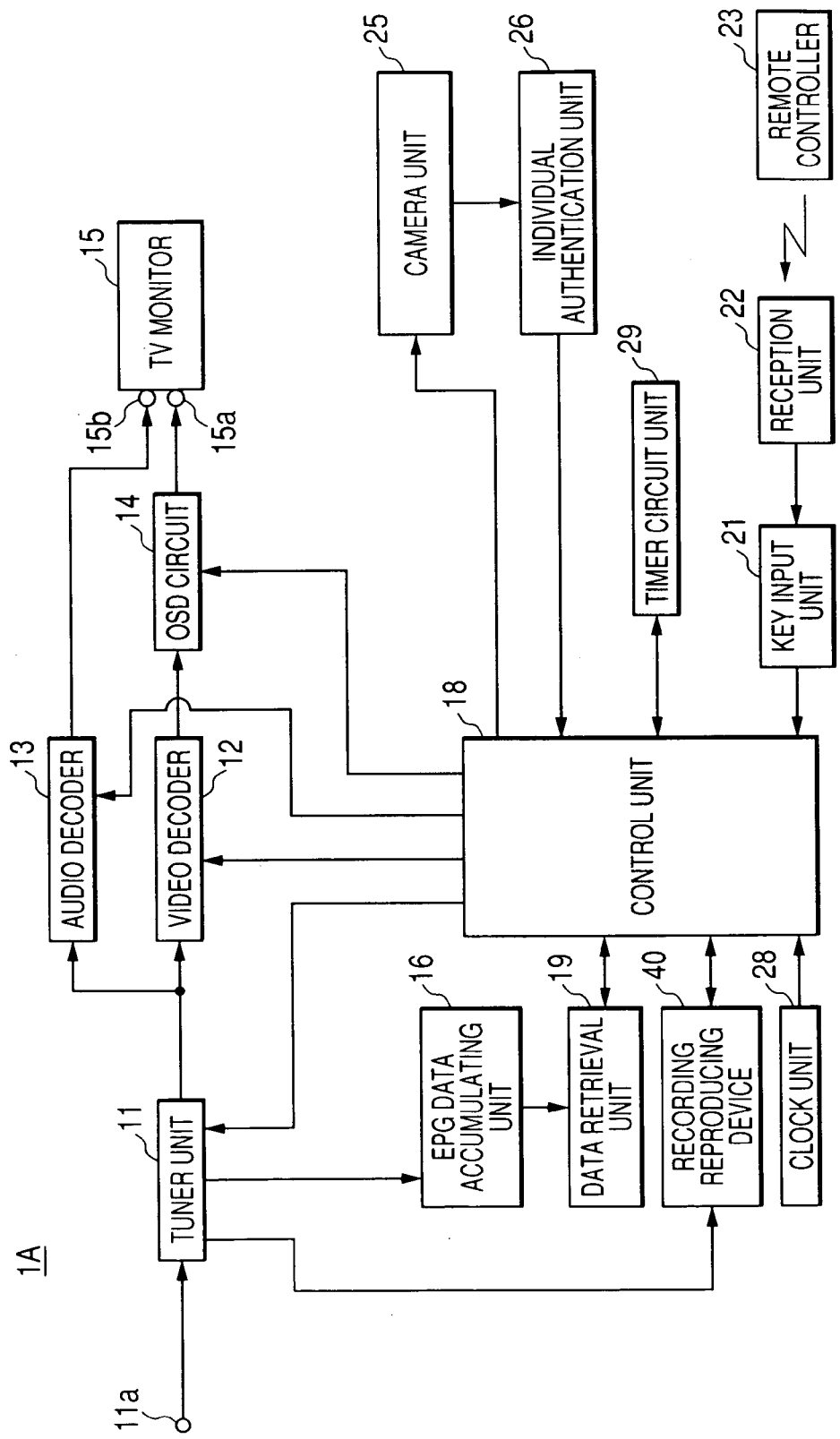
FIG. 1 is a functional block diagram illustrating an entire structure of a broadcasting signal receiving system according to a first embodiment.

FIG. 1 is a functional block diagram illustrating an entire structure of a broadcasting signal receiving system according to a first embodiment of the invention.

A broadcasting signal receiving system 1A has an input terminal 11a that inputs a broadcasting signal received by an antenna (not shown). The input terminal 11a is connected to a tuner unit 11. An output terminal of the tuner unit 11 is connected to a video decoder 12 that coverts a digital video signal into an analog video signal. In addition, the output terminal of the tuner unit 11 is connected to an audio decoder 13 that converts a digital audio signal into an analog audio signal. Further, an output terminal of the video decoder 12 is connected to a video input terminal 15a of a TV monitor 15 through an OSD (on-screen display) circuit 14. Furthermore, an output terminal of the audio decoder 13 is connected to an audio input terminal 15b of the TV monitor 15.

Further, the output terminal of the tuner unit 11 is connected to a recording reproducing device 40, such as, for example, a hard disk recorder, a DVD recorder or the like for recording the received broadcasting signal. The recording reproducing device 40 is connected to a control unit 18, which will be described in detail below.

Furthermore, the output terminal of the tuner unit 11 is connected to an EPG data accumulating unit 16 (RAM or EEPROM) that temporarily accumulates the newest electronic program guide (EPG) data included in the received broadcasting signal.

Although not shown in the drawings, the control unit 18 has a CPU, a ROM, a RAM or the like, and controls each of the tuner unit 11, the video decoder 12, the audio decoder 13, and the OSD circuit 14. Further, the control unit 18 is bidirectionally connected to a data retrieval unit 19 that retrieves the EPG data accumulated in the EPG data accumulating unit 16. The control unit 18 controls the data retrieval unit 19 with a predetermined timing so as to retrieve the EPG data accumulated in the EPG data accumulating unit 16.

Further, the control unit 18 is connected to a key input unit 21 that inputs various key operation signals to the control unit 18, and the key input unit 21 is connected to an output terminal of a reception unit 22 that receives key operation signals transmitted from a remote controller 23. That is, the key input unit 21 inputs operation signals using various keys (buttons or the like) provided on the front surface panel of a device main body to the control unit 18, and inputs to the control unit 18 the key operation signals transmitted from the remote controller 23 received by the reception unit 22. Furthermore, the control unit 18 is connected to a clock unit 28 for clocking current time and a timer circuit unit 29 for timing various times, which will be described in detail below.

Furthermore, the device main body is provided with a camera unit 25 (CCD camera unit) that is an image pickup unit to photograph a viewer. An output terminal of the camera unit 25 is connected to an individual authentication unit 26 that detects a face image from the photographed image and authenticates an individual on the basis of the detected face image. The authentication result by the individual authentication unit 26 is input to the control unit 18. In addition, the individual authentication unit 26 has a function for determining whether eyes are opened or closed on the basis of the detected face image.

In the above-mentioned structure, in the individual authentication unit 26, information, which indicates physical characteristics of all members of a family (in the first embodiment, characteristics of faces), is stored in an internal memory in advance. According to this information storing method, menu buttons of the remote controller 23 (not shown) are operated, and a registration mode of recognition information is selected. The recognition information registering mode executes a process that stores characteristic information of a subject recognized by the individual authentication unit 26 in a memory unit in advance.

Specifically, when recognition data of a child is created, a face of the child is photographed by the camera unit 25 in a state in which the child is spaced apart from the camera unit 25 by the designated distance. The individual authentication unit 26 creates the child recognition data on the basis of the photographed face image. The child recognition data (characteristic data) is stored in the internal memory. After that, in the individual authentication unit 26, a specific individual is authenticated on the basis of the authentication data stored in the internal memory.

The broadcasting signal receiving system according to the first embodiment has a simple recording function (a so-called time shift function) for recording a program that a viewer is viewing in the recording reproducing device 40 and sequentially deleting the recorded data in a recorded order whenever a predetermined time (for example, thirty minutes) lapses, and the control unit 18 makes the time shift function executed.

Further, the control unit 18 combines with each other the time shift function, an individual authentication technology using the individual authentication unit 26, and a detection technology for determining whether the viewer is present or whether the viewer is sleeping, and executes an automatic recording reproducing process of the program in accordance with the state of the viewer.

Hereinafter, specific examples will be described for the automatic recording reproducing process by the control unit 18.

Example 1

Figure 2:
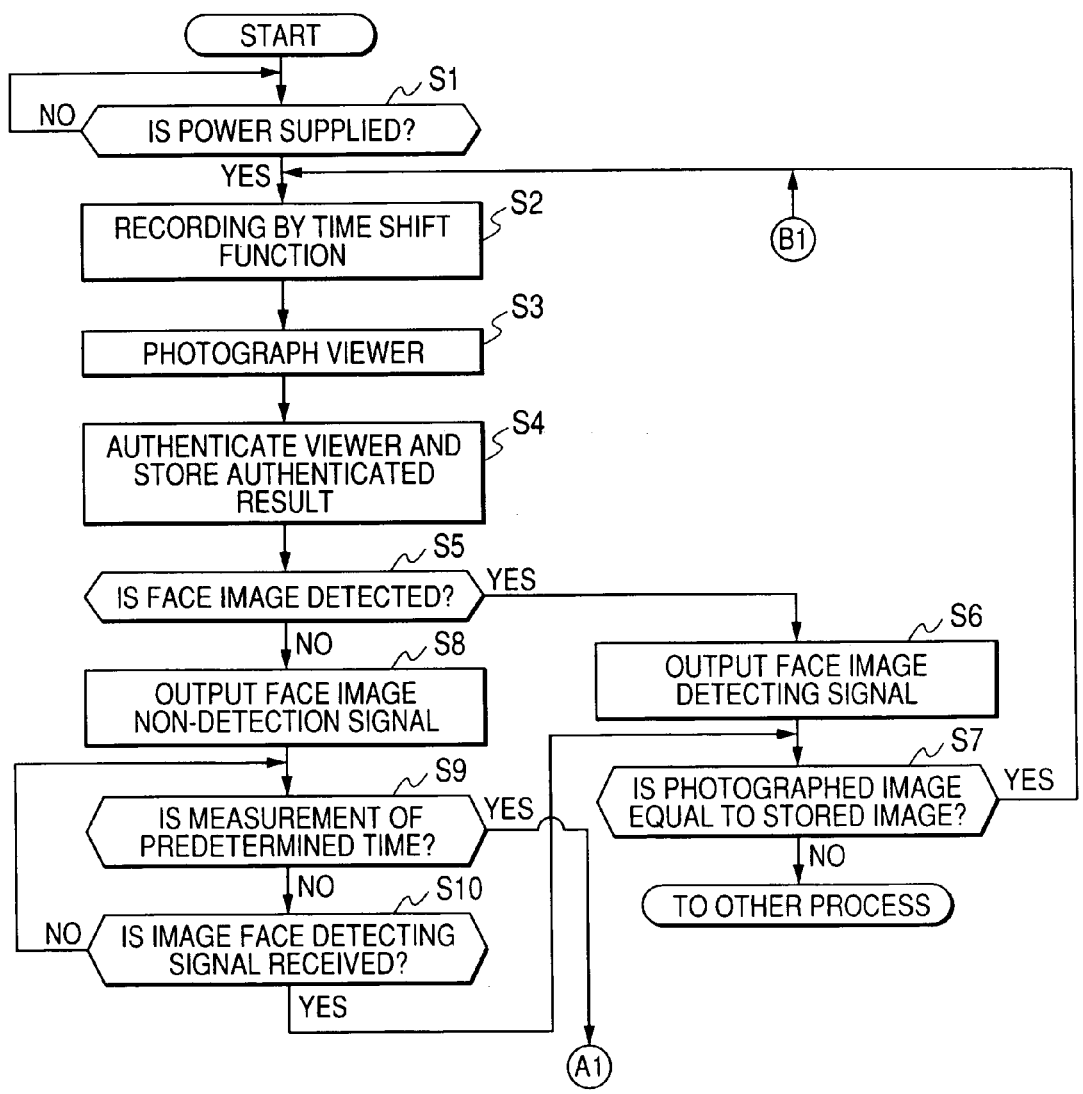
FIG. 2 is a flowchart illustrating an automatic recording reproducing process according to Example 1.
Figure 3:
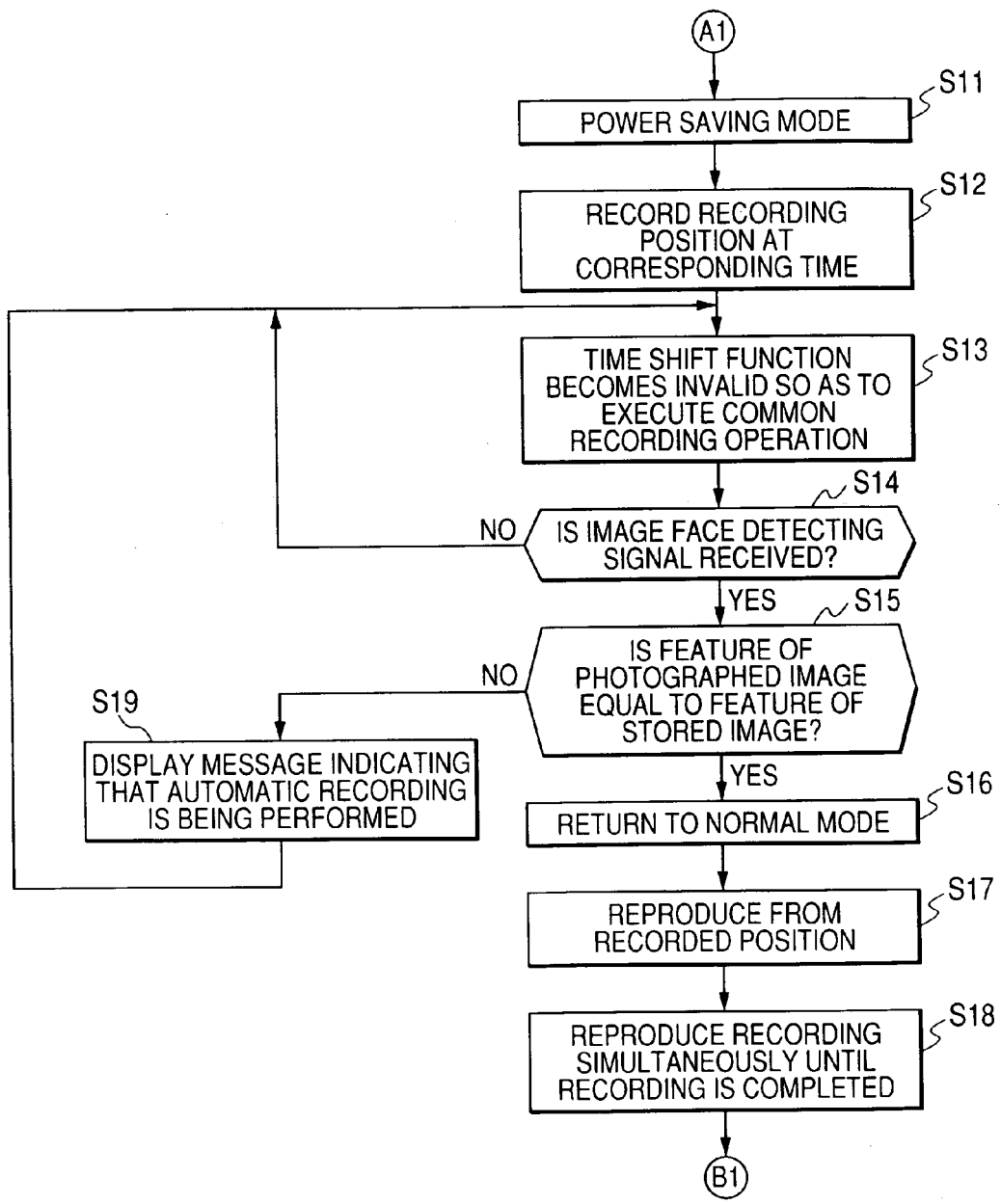
FIG. 3 is a flowchart illustrating an automatic recording reproducing process according to Example 1.

FIGS. 2 and 3 are flowcharts illustrating an automatic recording producing process according to Example 1. The Example 1 corresponds to a case in which the viewer leaves the front of a television receiver and then returns to the front of the television receiver again.

For example, if the television is turned on by means of the remote controller 23 (if determined as Yes in step S1), the control unit 18 starts recording by a time shift function (step S2), displays a program of a received channel on a screen of a TV monitor 15, and controls the camera unit 25 so as to start to photograph the viewer (step S3).

The individual authentication unit 26 compares features of a face image of the viewer photographed by the camera unit 25 with features of each of the family stored in the internal memory in advance so as to authenticate (specify) the corresponding viewer, and stores the authenticated result (features of a face image of a specific person who is currently viewing the program) in the internal memory (step S4). After that, the individual authentication unit 26 determines whether a face image could be detected from the image photographed by the camera unit 25 per one or two second for a period for which the television is provided with a power (step S5). In addition, if the face image could be detected (if determined as Yes in step S5), the individual authentication unit 26 outputs a face image detecting signal to the control unit 18 (step S6), and compares features of the face image with features of a face image of a specific person stored in the internal memory and always monitors whether a person who is currently viewing the program is the same person (step S7). If the person who is currently viewing the program is the same person, the process returns to step S2, and the above-mentioned processes are repeatedly performed.

In contrast, if the face image could not be detected in step S5 (if determined as No), the individual authentication unit 26 outputs a face image non-detection signal to the control unit 18 (step S8).

The control unit 18 is always monitoring the signals output from the individual authentication unit 26. In addition, if the control unit 18 receives the face image non-detection signal from the individual authentication unit 26, it allows the timer circuit unit 29 to be started such that the timer circuit unit 29 performs measurement of a predetermined time (for example, five seconds) (step S9), and monitors whether the face image detecting signal has been received from the individual authentication unit 26 (step S10). As a result, if the face image detecting signal has been received before the predetermined time lapses (if determined as No in step S9 and as Yes in step S10), the process proceeds to step S7.

In contrast, even though the predetermined time lapses, if the face image detecting signal is not received (if determined as Yes in step S9), it is determined that the viewer is not viewing the television in front of the television receiver, an operation mode of the television receiver is switched to a power saving mode (a standby mode in which a display state of the TV monitor 15 enters an off state, and each of the camera unit 25, the individual authentication unit 26, the receiving unit 22 or the like maintains an operation state) (step S11), a recording position of the corresponding time is recorded in the internal memory (step S12), the recording of the reception program by the recording reproducing device 40 is continued in a common recording state in which the time shift function becomes invalid (step S13).

In this state, the control unit 18 is always monitoring whether the face image detecting signal has been received from the individual authentication unit 26 (step S14) Further, if the face image detecting signal has been received (if determined as Yes in step S14), the control unit 18 compares features of the face image photographed by the camera unit 25 with features of the face image of the specific person stored in the internal memory, and determines whether the returned person is the same person as the first person (step S15). Next, if it is determined that the returned person is the same person as the first person (if determined as Yes in step S15), the control unit 18 makes the operation mode of the system return to the common mode from the power saving mode (step S16), so that the recorded program returns to the recorded position so as to be reproduced while maintaining the recording state (step S17). However, the recorded program may return to the previous frame of the recorded position so as to be reproduced. In addition, the recording reproduction is simultaneously performed until the program is finished (step S18), and after the recording reproduction is finished, the process returns to step S2, and the above-mentioned processes are repeated.

In contrast, if determined as No in step S15, that is, if the returned person is different from the first person, it is notified to the viewer that the automatic recording is being performed (step S19), and the process returns to step S15. In this case, a method of displaying a message on the screen of the TV monitor 15 is the most common method as a notification method, but the notification using the sound, the notification using the lightening and flickering in the display unit such as an LED or the like, and the combination thereof may be used.

Further, in Example 1, if it is determined that the returned person is the same person as the first person in step S15, the recorded program returns to the recorded position so as to be automatically reproduced. However, the viewer may select whether the automatic reproduction is made to be performed before performing the automatic reproduction. That is, when the time for which the viewer is not in front of the television receiver is relatively short, the viewer may think viewing the corresponding program in a state in which the viewer skips the missed portion of the corresponding program. Therefore, since the viewer can select whether the viewer wants to view the missed portions of the program gain after the viewer returns to the front of the television receiver, it is possible to achieve a convenient system having options for a viewer.

In addition, in Example 1, if the returned person is different from the first person (if determined as No in step S15), it is notified to the viewer that the automatic recording is being performed, but erroneous operation may be generated in a case of using only the notification message. That is, a different viewer may accidentally perform power supply operation or recording operation. Therefore, if determined as No in step S15, the control unit 18 may make the operation input by the different person invalid, so that the recording state may be maintained. In this case, a warning message indicating that the input is invalid may be displayed on the screen of the TV monitor 15. Thereby, the careless operation by the different person, that is, the operation, such as stopping the automatic recording or the like can be prevented from occurring.

Further, according to Example 1, in step S13, in the common recording state where the time shift function becomes invalid, the receiving program is continuously recorded by the recording reproducing device 40. However, at this time, the information of the program, which is recording, is acquired from the EPG data accumulated in the EPG data accumulating unit 16. When the program is close to the completion time of the program which is recording before determined as Yes in step S14, the recording may be stopped so as to cut off the power. In addition, when the viewer allows the television receiver to be supplied with a power again, if the recorded program was not viewed by the viewer, a message indicating that the recorded program was not viewed is notified to the viewer (displaying a message on a screen of the TV monitor 15) such that the viewer can select whether the viewer wants to view the recorded program.

Example 2

Figure 4:
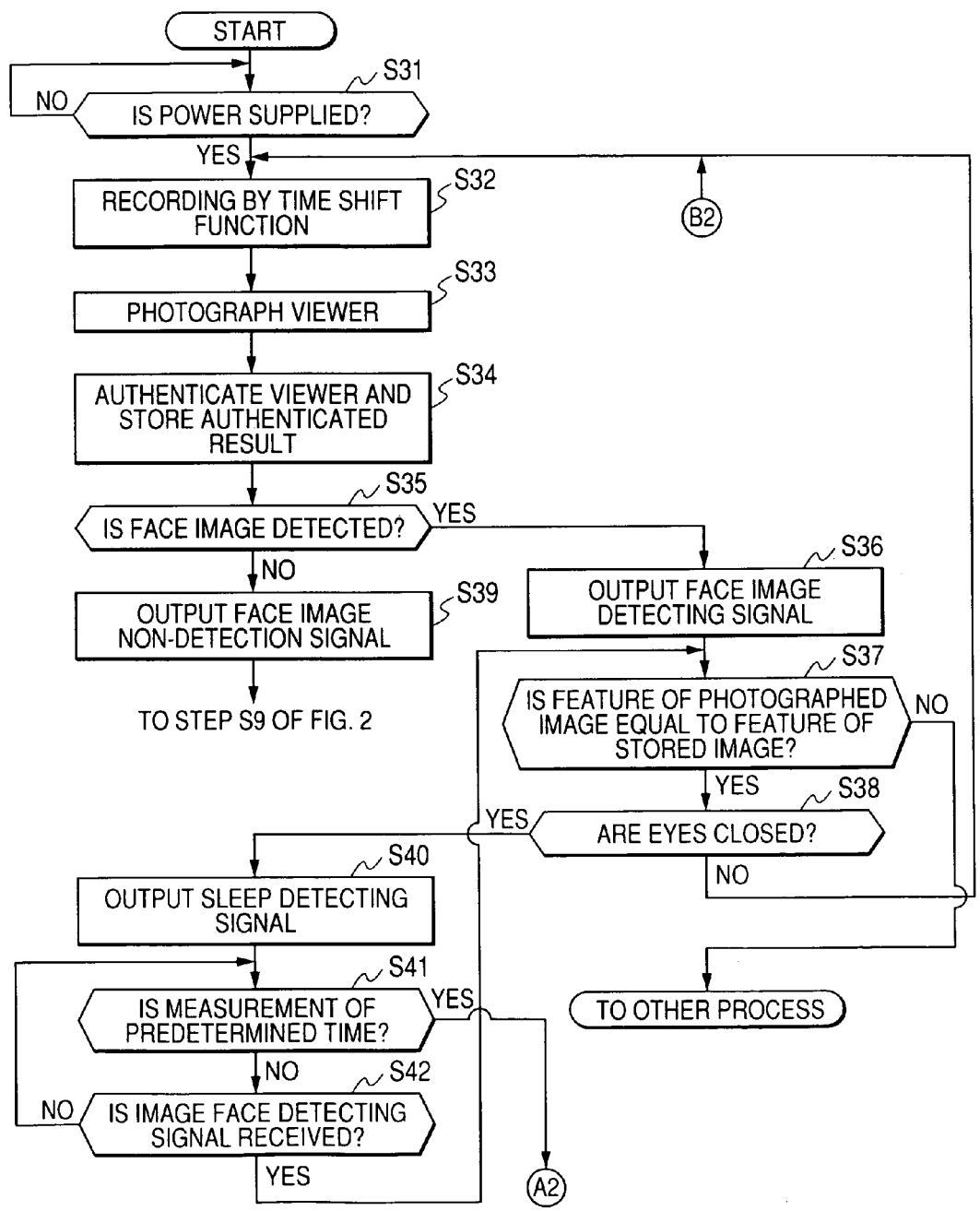
FIG. 4 is a flowchart illustrating an automatic recording reproducing process according to Example 2.
Figure 5:
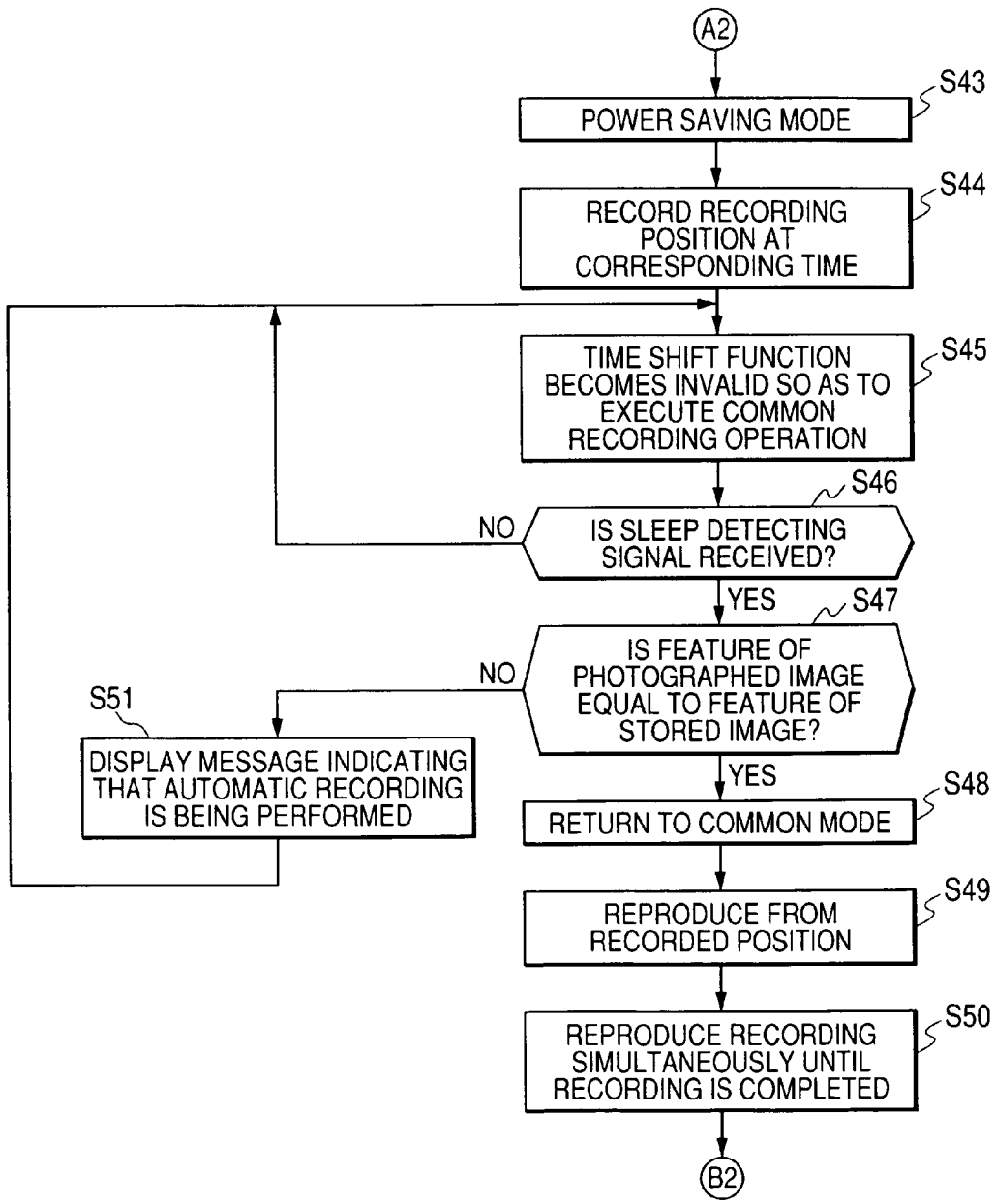
FIG. 5 is a flowchart illustrating an automatic recording reproducing process according to Example 2.

FIGS. 4 and 5 are flowcharts illustrating an automatic recording reproducing process according to Example 2. Example 2 corresponds to a case in which the viewer is sleeping in front of the television receiver.

For example, if the television is turned on by the remote controller 23 (if determined as Yes in step S31), the control unit 18 starts the recording by the time shift function (step S32), displays the program of the received channel on a screen of the TV monitor 15, controls the camera unit 25, and starts photographing of the viewer (step S33).

The individual authentication unit 26 compares features of the face image of the viewer photographed by the camera unit 25 with features of each of the family registered in advance in the internal memory so as to authenticate (specify) the viewer, and stores the authenticated result (features of the face image of the specific person who is currently viewing the program) in the internal memory (step S34). After that, the individual authentication unit 26 determines whether a face image could be detected from the image photographed by the camera unit 25 per one or two second for a period for which the television is provided with a power (step S35). In addition, if the face image could be detected (if determined as Yes in step S35), the individual authentication unit 26 outputs a face image detecting signal to the control unit 18 (step S36), and compares features of the face image with features of a face image of a specific person stored in the internal memory and always monitors whether a person who is currently viewing the program is the same person (step S37). In addition, the individual authentication unit 26 always determines an opened/closed state of eyes from the face image of the viewer photographed by the camera unit 25 (step S38). As a result, if the person who is currently viewing the program is the same person (Yes in step S37) and the eyes are opened (Yes in step S38), the process returns to step S32, and the above-mentioned processes are repeatedly performed.

In contrast, if the face image could be detected in step S35 (if determined as No), the individual authentication unit 26 outputs a face image non-detection signal to the control unit 18 (step S38). After the face image non-detection signal is received, since the control unit 18 performs the processes corresponding to steps after step S9 including the process of step S9 according to Example 1 illustrated in FIG. 2, the description thereof will be omitted so as to avoid the repeated description.

Further, if it is determined that the eyes have been closed in step S38 (if determined as Yes), a sleep detecting signal indicating that the viewer enters a sleeping state is output to the control unit 18 (step S40).

The control unit 18 always monitors the signals transmitted from the individual authentication unit 26. In addition, if the sleep detecting signal is received from the individual authentication unit 26, the control unit 18 allows the timer circuit unit 29 to be started such that the timer circuit unit 29 performs measurement of a predetermined time (for example, five seconds) (step S41), and monitors whether the sleep detecting signal is being received from the individual authentication unit 26 (step S42). As a result, if the sleep detecting signal is not received before a predetermined time lapses (if determined as No in step S41 and as Yes in step S42), the process proceeds to step S37.

In contrast, if the sleep detecting signal is received after the predetermined time lapses (if determined as Yes in step S41), it is determined as a sleeping state in which the viewer is closing his eyes in front of the television receiver for the predetermined time or more, and the operation mode of the television receiver is switched to the power saving mode (a standby mode in which a display state of the TV monitor 15 enters an off state, and each of the camera unit 25, the individual authentication unit 26, the receiving unit 22 or the like maintains an operation state) (step S43), the recording position of the corresponding time is stored in the internal memory (step S44), and the recording of the receiving program by the recording reproducing device 40 is continued in a common recording state in which the time shift function becomes invalid (step S45).

In this state, the control unit 18 always monitors whether the sleep detecting signal is being received from the individual authentication unit 26 (step S46). In addition, if the sleep detecting signal is not received (if determined as Yes in step S46), it is determined that the viewer opens his eyes again. Next, the control unit 18 compares features of the face image photographed by the camera unit 25 with features of each of the family stored in the internal memory, determines whether the detected person is the same person as the first person (step S47). In this case, if it is determined that the detected person is the same person as the first person (if determined as Yes in step S47), the control unit 18 makes the operation mode of the system return to the common mode from the power saving mode at the corresponding time (step S48), and makes the recorded program return to the recorded position so as to be reproduced while maintaining the recording state (step S49). However, the recorded program may return to the previous frame of the recorded position so as to be reproduced. In addition, the recording reproduction is simultaneously performed until the program is finished (step S50), and after the recording reproduction is finished, the process returns to step S32, and the above-mentioned processes are repeated.

In contrast, if determined as No in step S47, that is, if the detected person is different from the first person, it is notified to the viewer that the automatic recording is being performed (step S51), and the process proceeds to step S47. In this case, a method of displaying a message on the screen of the TV monitor 15 is the most common method as a notification method, but the notification using the sound, the notification using the lightening and flickering in the display unit such as an LED or the like, and the combination thereof may be used.

Further, in Example 2, if it is determined that the person whose eyes are opened is the same person as the first person in step S47, the recorded program returns to the recorded position so as to be automatically reproduced. However, the viewer may select whether the automatic reproduction is made to be performed before performing the automatic reproduction. That is, when the time for which the viewer was sleeping in front of the television receiver is relatively short, the viewer may think viewing the corresponding program in a state in which the viewer skips the missed portion of the corresponding program. Therefore, since the viewer can select whether the viewer wants to view the missed scenes of the program gain after the viewer wakes up from a sleep, it is possible to achieve a convenient system having options for a viewer.

In addition, in Example 2, if the person who wakes up from a sleep is different from the first person (if determined as No in step S47), which is seldom generated, it is notified to the viewer that the automatic recording is being performed, but erroneous operation may be generated in a case of using only the notification message. That is, a different viewer may accidentally perform power supply operation or recording operation. Therefore, when determined as No in step S47, the control unit 18 may make the operation input by the different person invalid, so that the recording state may be continued. In this case, a warning message indicating that the input is invalid may be displayed on the screen of the TV monitor 15. Thereby, the careless operation by the different person, that is, the operation, such as stopping the automatic recording or the like can be prevented from occurring.

Further, according to Example 2, in step S45, in the common recording state where the time shift function is made to be invalid, the receiving program is continuously recorded by the recording producing device 40. However, at this time, the information of the program, which is recording, is acquired from the EPG data accumulated in the EPG data accumulating unit 16. When the program is close to the completion time of the program which is recording before determined as Yes in step S46, the recording may be stopped so as to cut off the power. In addition, when the viewer allows the television receiver to be supplied with a power again, if the recorded program was not viewed by the viewer, a message indicating that the recorded program was not viewed is notified to the viewer (displaying a message on a screen of the TV monitor 15) such that the viewer can select whether the viewer wants to view the recorded program.

Example 3

Figure 6:
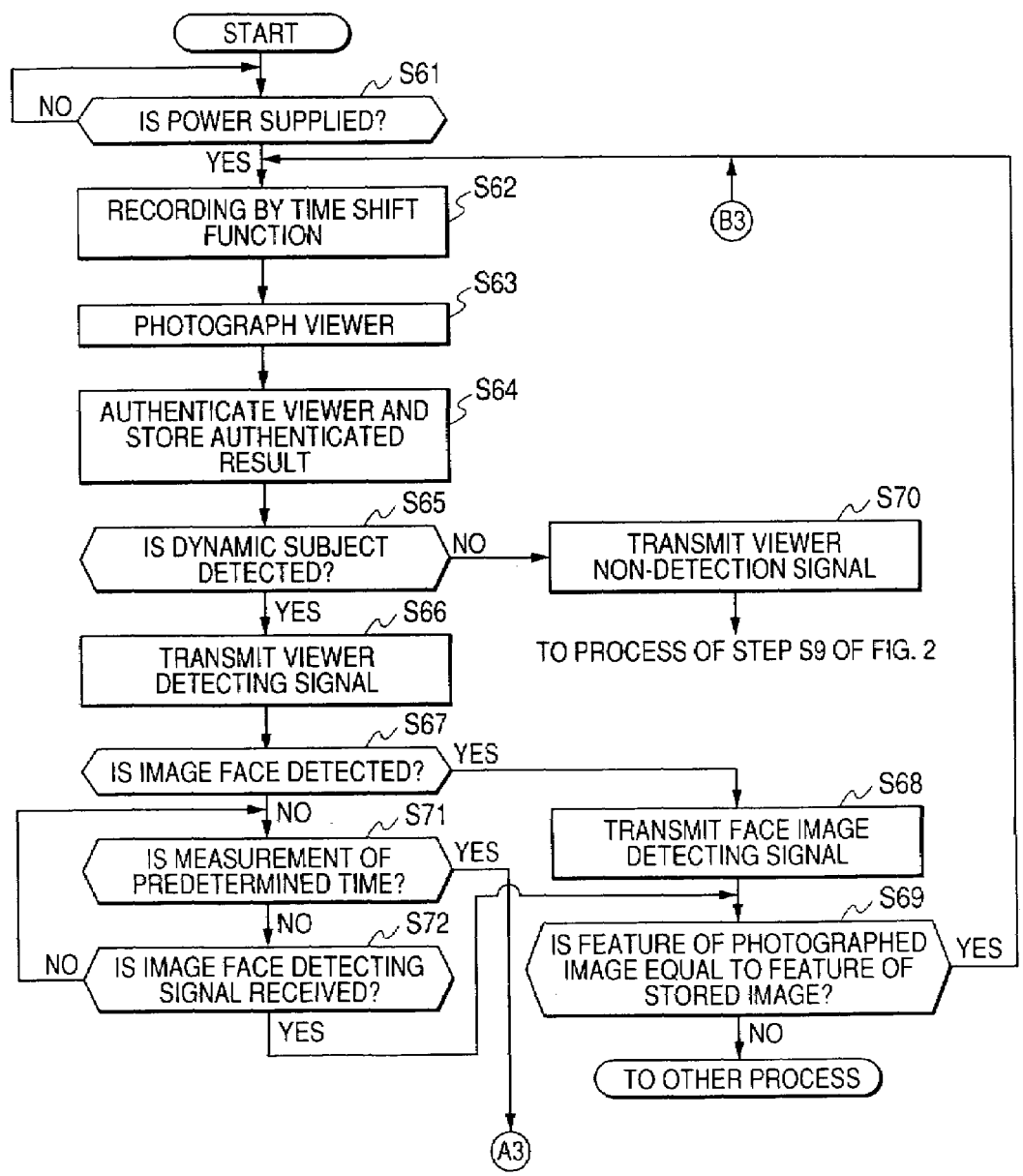
FIG. 6 is a flowchart illustrating an automatic recording reproducing process in a broadcasting signal receiving system according to Example 3.
Figure 7:
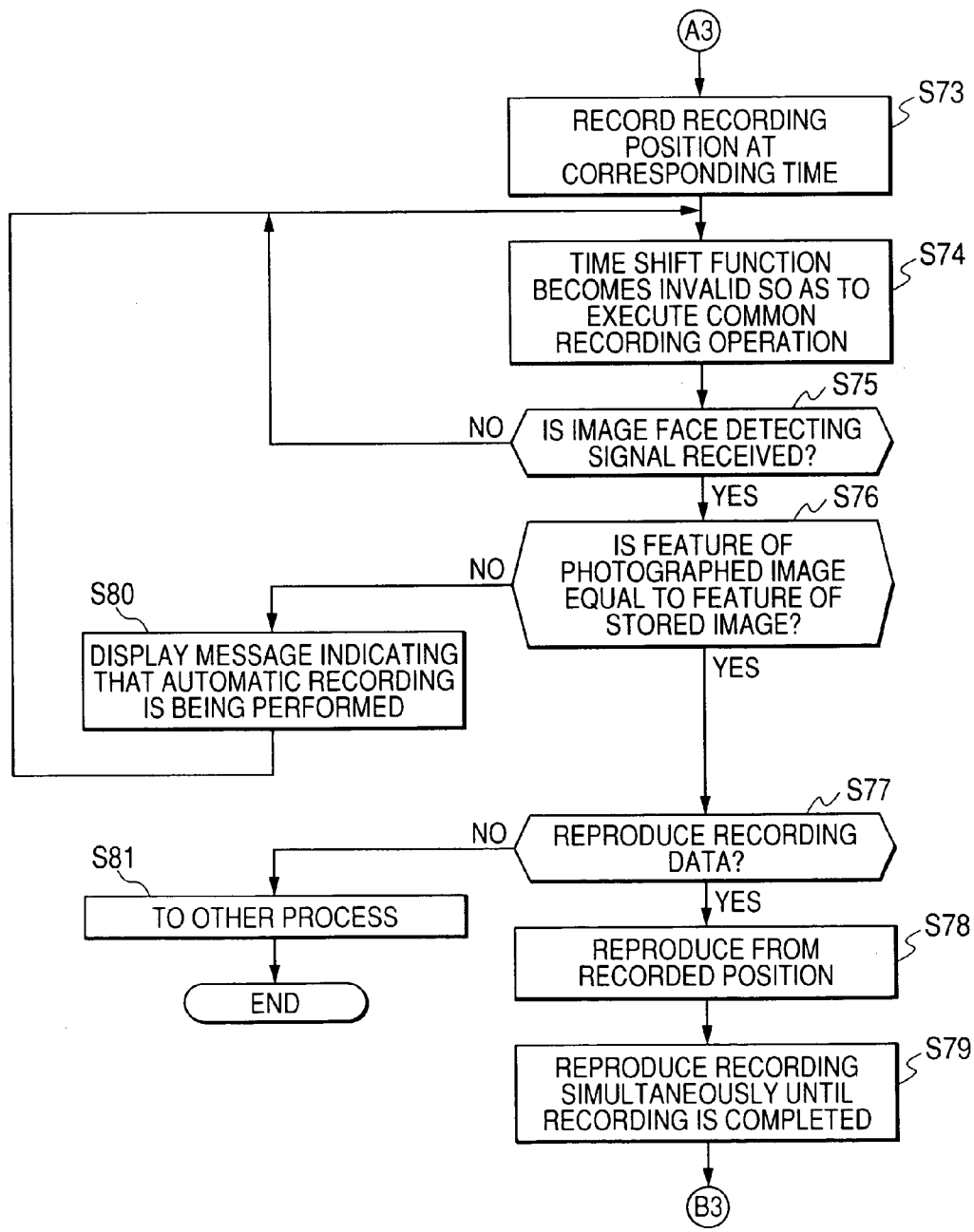
FIG. 7 is a flowchart illustrating an automatic recording reproducing process according to Example 3.

FIGS. 6 and 7 are flowcharts illustrating an automatic recording reproducing process according to Example 3. Example 3 corresponds to a case in which the viewer is in front of the television receiver, but it cannot be determined whether the viewer is really viewing the broadcasting program (that is, in a case in which the viewer is performing another activity while watching the television).

If the television is turned on by the remote controller 23 (if determined as Yes in step S61), the control unit 18 starts the recording by the time shift function (step S62), displays the program of the received channel on a screen of the TV monitor 15, controls the camera unit 25, and starts photographing of the viewer (step S63).

The individual authentication unit 26 compares features of the face image of the viewer photographed by the camera unit 25 with features of each of the family registered in advance in the internal memory so as to authenticate (specify) the viewer, and stores the authenticated result (features of the face image of the specific person who is currently viewing the program) in the internal memory (step S64). After that, the individual authentication unit 26 determines whether the viewer could be detected from the image photographed by the camera unit 25 for a period for which the television is provided with a power (step S65). In addition, if the viewer could be detected (if determined as Yes in step S65), the individual authentication unit 26 outputs a viewer detecting signal to the control unit 18 (step S66), and it is then determined that the face image could be detected from the photographed image (step S67). In addition, if the face image could be detected (if determined as Yes in step S67), the individual authentication unit 26 outputs the face image detecting signal to the control unit 18 (step S68), compares features of the face image with features of a face image of a specific person stored in the internal memory and always monitors whether a person who is currently viewing the program is the same person (step S69). In addition, if the person who is currently viewing the program is the same person, the process returns to step S62, and the above-mentioned processes are repeatedly performed.

The control unit 18 always monitors the signals transmitted from the individual authentication unit 26. In addition, if the viewer could not be detected in step S65 (if determined as No), the individual authentication unit 26 outputs a viewer non-detection signal to the control unit 18 (step S70). After the viewer non-detection signal is received, since the control unit 18 performs the processes corresponding to steps after step S9 including the process of step S9 according to Example 1 illustrated in FIG. 2, the description thereof will be omitted so as to avoid the repeated description.

Further, if the viewer detecting signal is received from the individual authentication unit 26 but the face image non-detection signal is received, that is, the viewer could be detected but the face image could not be detected (if determined as Yes in step S65 and No in step S67), the control unit 18 allows the timer circuit unit 29 to be started such that the timer circuit unit 29 starts the measurement of the predetermined time (for example, five seconds) (step S71), and monitors whether the face image detecting signal is being received from the individual authentication unit 26 (step S72). As a result, if the face image detecting signal is received before a predetermined time lapses (if determined as No in step S71 and as Yes in step S72), the process proceeds to step S69.

In contrast, if the face image detecting signal is not received after the predetermined time lapses (if determined as Yes in step S71), it is determined that it is not possible to determine whether the viewer is viewing the corresponding broadcasting program, the recording position of the corresponding time is stored in the internal memory (step S73), and the recording of the receiving program by the recording reproducing device 40 is continued in a state in which the time shift function becomes invalid (step S74).

In this state, the control unit 18 always monitors whether the face image detecting signal is being received from the individual authentication unit 26 (step S75). In addition, if the face image detecting signal is received (if determined as Yes in step S75), the control unit 18 compares features of the face image photographed by the camera unit 25 with features of the face image of the specific person stored in the internal memory, determines whether the person corresponding to a face image having been detected again is the same person as the first person (step S76). In this case, if it is determined that the person is the same person as the first person (if determined as Yes in step S76), it is notified to the viewer whether the viewer wants to reproduce the recorded data (for example, display a confirmation message on a screen of the TV monitor 15 for the viewer to confirm it) (step S77). In the meantime, if the viewer presses on a reproduction button of the remote controller 23 (if determined as Yes in step S77), the recorded program returns to the recorded position so as to be reproduced (step S78). However, the recorded program may return to the previous frame of the recorded position so as to be reproduced. In addition, the recording reproduction is simultaneously performed until the program is finished (step S79), and after the recording reproduction is finished, the process returns to step S62, and the same process is repeated. In the meantime, when the viewer has selected different operation in step S77, the process is executed in accordance with the selected operation (step S81).

In contrast, if determined as No in step S76, that is, if the person whose face image is detected again is different from the first person, it is notified to the viewer that the automatic recording is being performed (step S80), and the process returns to step S76. In this case, a method of displaying a message on the screen of the TV monitor 15 is the most common method as a notification method, but the notification using the sound, the notification using the lightening and flickering in the display unit such as an LED or the like, and the combination thereof may be used.

Further, in Example 3, if it is determined that the person whose face image is detected again is different from the first person (if determined as No in step S76), it is notified to the viewer that the automatic recording is being performed, but erroneous operation may be generated in a case of using only the notification message. That is, a different viewer may accidentally perform power supply operation or recording operation. Therefore, when determined as No in step S76, the control unit 18 may make the operation input by the different person invalid, so that the recording state may be continued. In this case, a warning message indicating that the input is invalid may be displayed on the screen of the TV monitor 15. Thereby, the careless operation by the different person, that is, the operation, such as stopping the automatic recording or the like can be prevented from occurring.

Further, according to Example 3, in step S74, in the common recording state where the time shift function is made to be invalid, the receiving program is continuously recorded by the recording producing device 40. However, at this time, the information of the program, which is recording, is acquired from the EPG data accumulated in the EPG data accumulating unit 16. When the program is close to the completion time of the recorded program which is recording before determined as Yes in step S75, the recording may be stopped so as to cut off the power. In addition, when the viewer allows the television receiver to be supplied with a power again, if the recorded program was not viewed by the viewer, a message indicating that the recorded program was not viewed is notified to the viewer (displaying a message on a screen of the TV monitor 15) such that the viewer can select whether the viewer wants to view the recorded program.

Example 4

Figure 8:
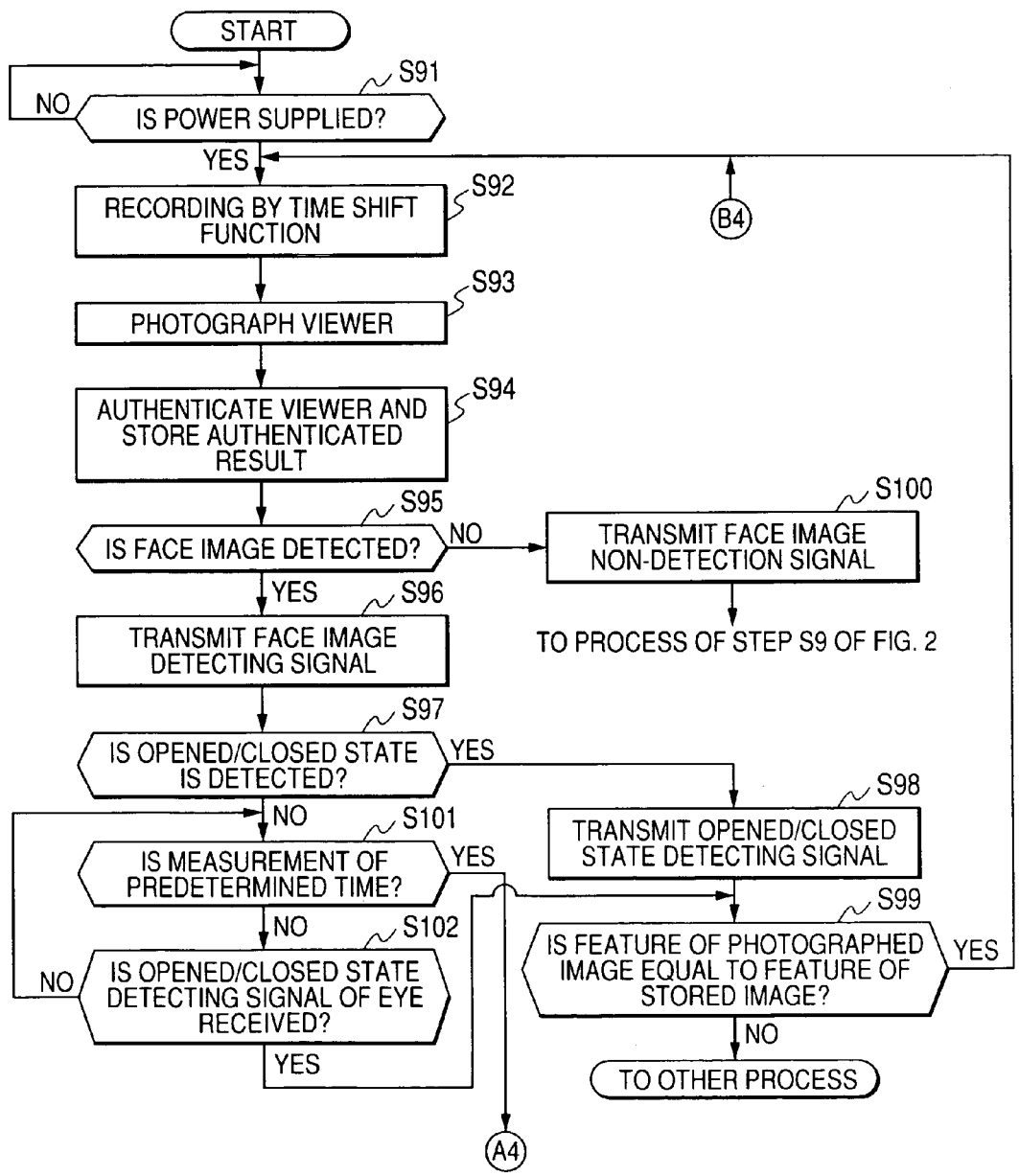
FIG. 8 is a flowchart illustrating an automatic recording reproducing process according to Example 4.
Figure 9:
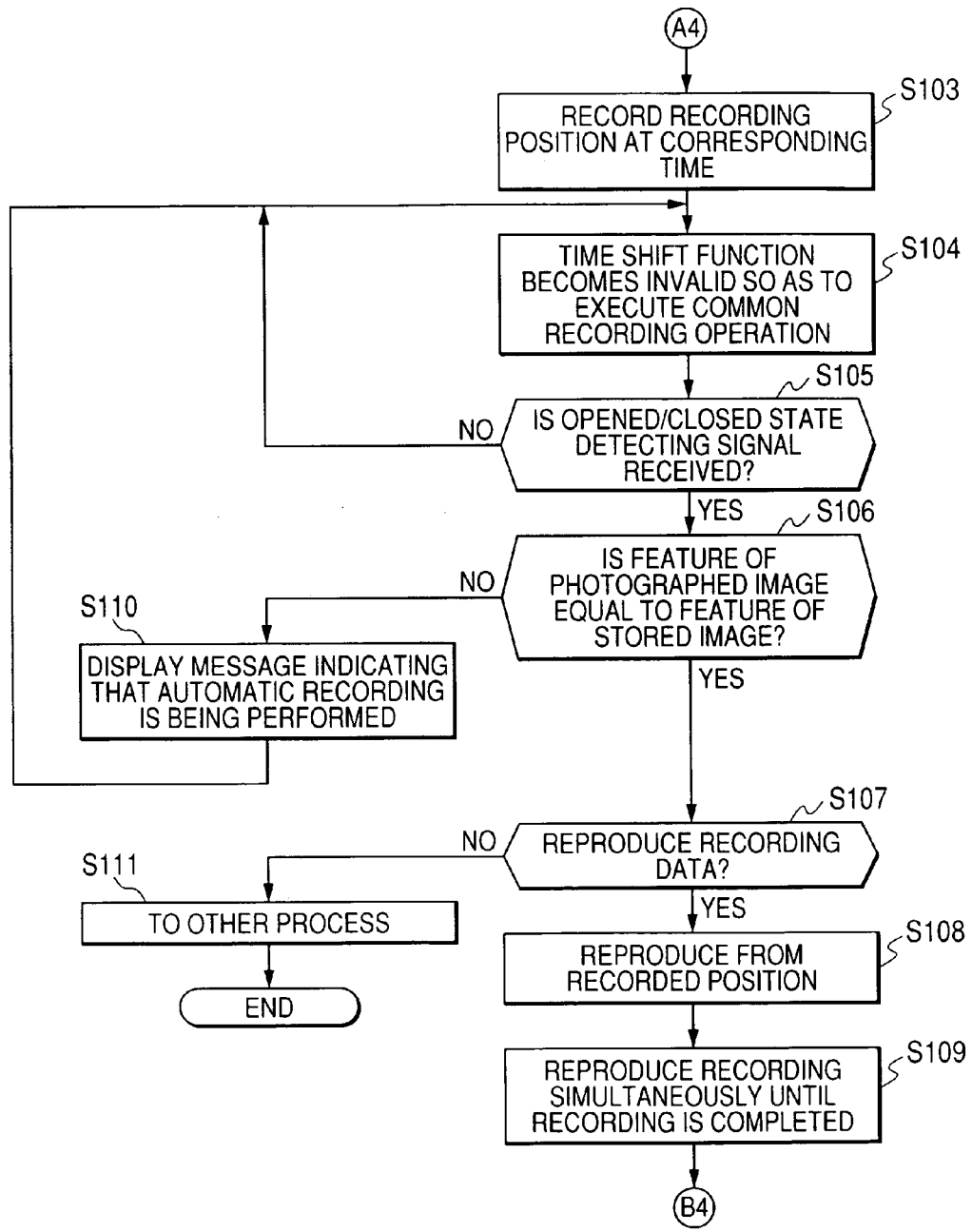
FIG. 9 is a flowchart illustrating an automatic recording reproducing process according to Example 4.

FIGS. 8 and 9 are flowcharts illustrating an automatic recording reproducing process according to Example 4. Example 4 corresponds to a case in which the viewer is in front of the television receiver, but it cannot be determined whether the viewer is really viewing the broadcasted program (that is, a case in which it cannot be determined whether the viewer is closing his eyes).

If the television is turned on by the remote controller 23 (if determined as Yes in step S91), the control unit 18 starts the recording by the time shift function (step S92), displays the program of the received channel on a screen of the TV monitor 15, controls the camera unit 25, and starts photographing of the viewer (step S93).

The individual authentication unit 26 compares features of the face image of the viewer photographed by the camera unit 25 with features of each of the family registered in advance in the internal memory so as to authenticate (specify) the viewer, and stores the authenticated result (features of the face image of the specific person who is viewing the program) in the internal memory (step S94). After that, the individual authentication unit 26 determines whether the face image of the viewer could be detected from the image photographed by the camera unit 25 for a period for which the television is provided with a power (step S95). In addition, if the face image of the viewer could be detected (if determined as Yes in step S95), the individual authentication unit 26 outputs a face image detecting signal to the control unit 18 (step S96), and it is then determined whether an opened/closed state of eyes of the viewer could be detected from the photographed image (step S97). In addition, if the opened/closed state of the eyes of the viewer could be detected (if determined as Yes in step S97), the individual authentication unit 26 outputs the opened/closed state detecting signal to the control unit 18 (step S98), compares features of the face image of the viewer with features of a face image of a specific person stored in the internal memory and always monitors whether a person who is currently viewing the program is the same person (step S99). In addition, if the person who is currently viewing the program is the same person, the process returns to step S92, and the above-mentioned processes are repeatedly performed.

In contrast, the control unit 18 always monitors the signals transmitted from the individual authentication unit 26. In addition, if the viewer could not be detected in step S95 (if determined as No), the individual authentication unit 26 outputs a face image non-detection signal to the control unit 18 (step S100). After the face image non-detection signal is received, since the control unit 18 performs the processes corresponding to steps after step S9 including the process of step S9 according to Example 1 illustrated in FIG. 2, the description thereof will be omitted so as to avoid the repeated description.

Further, if the face image detecting signal is received from the individual authentication unit 26 but the opened/closed state image non-detection signal is received, that is, the face image of the viewer could be detected but the opened/closed state of the eyes could not be detected (if determined as Yes in step S95 and No in step S97), the control unit 18 allows the timer circuit unit 29 to be started such that the timer circuit unit 29 starts the measurement of the predetermined time (for example, five seconds) (step S101), and monitors whether the opened/closed state detecting signal of the eyes is being received from the individual authentication unit 26 (step S102). As a result, if the opened/closed state detecting signal of the eyes is received before a predetermined time lapses (if determined as No in step S101 and Yes in step S102), the process proceeds to step S99.

In contrast, if the opened/closed state detecting signal of the eyes is not received after the predetermined time lapses (if determined as Yes in step S101), it is determined that it is not possible to determine whether the viewer is viewing the corresponding broadcasting program, the recording position of the corresponding time is stored in the internal memory (step S103), and the recording of the receiving program by the recording reproducing device 40 is continued in a common recording state in which the time shift function becomes invalid (step S104).

In this state, the control unit 18 always monitors whether the opened/closed state detecting signal of the eyes is being received from the individual authentication unit 26 (step S105). In addition, if the opened/closed state detecting signal of the eyes is received (if determined as Yes in step S105), the control unit 18 compares features of the face image photographed by the camera unit 25 with features of the face image of the specific person stored in the internal memory, and determines whether the person corresponding the face image having been detected again (face image including the opened/closed state of the eyes) is the same person as the first person (step S106). In this case, if it is determined that the person is the same person as the first person (if determined as Yes in step S106), it is confirmed to the viewer whether the viewer wants to reproduce the recorded data (for example, display a confirmation message on a screen of the TV monitor 15 for the viewer to confirm it) (step S107) In the meantime, if the viewer presses on a reproduction button of the remote controller 23 (if determined as Yes in step S107), the recorded program returns to the recorded position so as to be recorded (step S108). However, the recorded program may return to the previous frame of the recorded position so as to be reproduced. In addition, the recording reproduction is simultaneously performed until the program is finished (step S109), and after the recording reproduction is finished, the process returns to step S92, and the same process is repeated. In the meantime, if the viewer selects another operation in step S107, the process is performed in accordance with the selected operation (step S111).

In contrast, if determined as No in step S106, that is, if the person whose face image is detected again is different from the first person, it is notified to the viewer that the automatic recording is being performed (step S110), and the process returns to step S96. In this case, a method of displaying a message on the screen of the TV monitor 15 is the most common method as a notification method, but the notification using the sound, the notification using the lightening and flickering in the display unit such as an LED or the like, and the combination thereof may be used.

Further, in Example 4, if it is determined that the person whose face image is detected again is different from the first person (if determined as No in step S106), it is notified to the viewer that the automatic recording is being performed, but erroneous operation may be generated in a case of using only the notification message. That is, a different viewer may accidentally perform power supply operation or recording operation. Therefore, when determined as No in step S106, the control unit 18 may make the operation input by the different person invalid, so that the recording state may be continued. In this case, a warning message indicating that the input is invalid may be displayed on the screen of the TV monitor 15. Thereby, the careless operation by the different person, that is, the operation, such as stopping the automatic recording or the like can be prevented from occurring.

Further, according to Example 4, in step S104, in the common recording state where the time shift function is made to be invalid, the receiving program is continuously recorded by the recording producing device 40. However, at this time, the information of the program, which is recording, is acquired from the EPG data accumulated in the EPG data accumulating unit 16. When the program is close to the completion time of the recorded program which is recording before determined as Yes in step S105, the recording may be stopped so as to cut off the power. In addition, when the viewer allows the television receiver to be supplied with a power again, if the recorded program was not viewed by the viewer, a message indicating that the recorded program was not viewed is notified to the viewer (displaying a message on a screen of the TV monitor 15) such that the viewer can select whether the viewer wants to view the recorded program.

Second Embodiment

Figure 10:
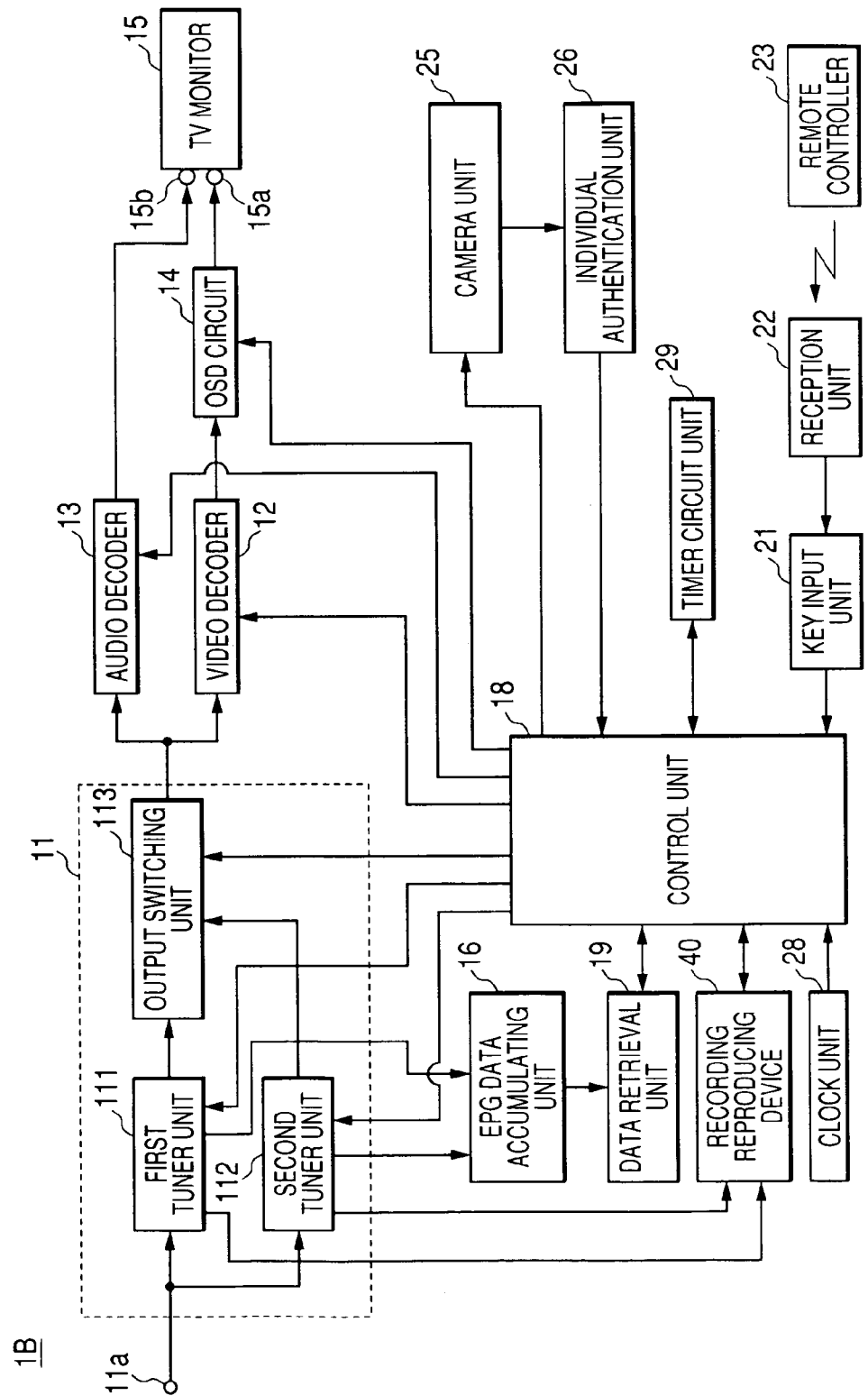
FIG. 10 is a functional block diagram illustrating an entire structure of a broadcasting signal receiving system according to a second embodiment.

FIG. 10 is a functional block diagram illustrating an entire structure of a broadcasting signal receiving system according to a second embodiment of the invention.

A broadcasting signal receiving system 1B according to the second embodiment of the invention is different from the broadcasting signal receiving system 1A according to the first embodiment in that it has a plurality of tuner units (that is, a first tuner unit 111 and a second tuner unit 112) and an output switching unit 113 that switches output of the first tuner unit 111 and output of the second tuner unit 112 so as to output them to a video decoder 12 and an audio decoder 13. The other structure of the broadcasting signal receiving system 1B according to the second embodiment is the same as that of the broadcasting signal receiving system 1A according to the first embodiment. Therefore, the same blocks as the first embodiment are denoted by the same reference numerals, and the detailed description thereof will be omitted.

As such, the plurality of tuner units are provided. As a result, the processes in the first to fourth examples according to the first embodiment are further more developed, so that the processes can be carried out, as in the following fifth to eighth examples.

Example 5

Figure 11:
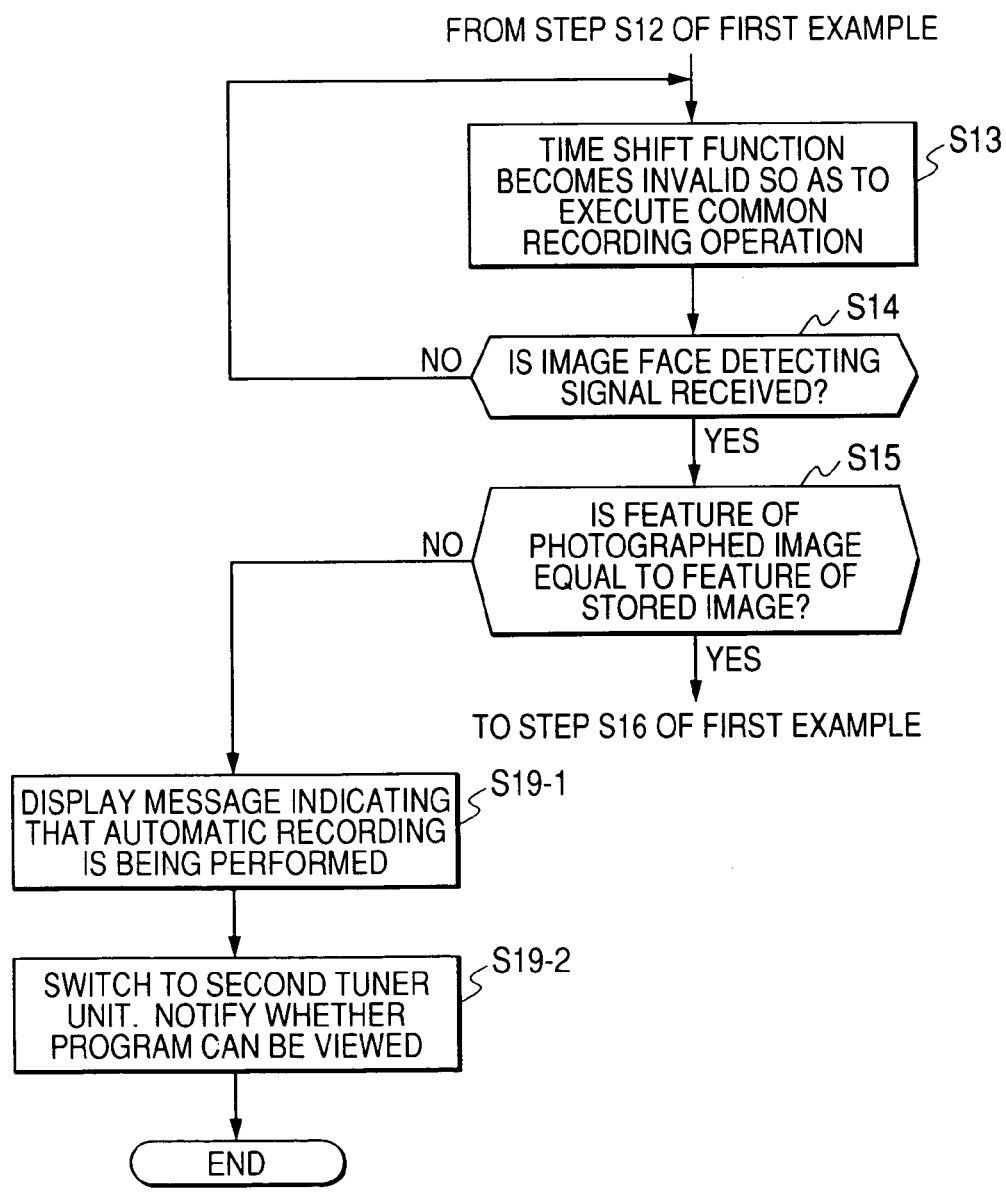
FIG. 11 is a flowchart illustrating an automatic recording reproducing process according to Example 5.

Example 5 corresponds to a modification of Example 1. FIG. 11 is a flowchart illustrating an automatic recording reproducing process according to Example 5. However, FIG. 11 illustrates only a main body of Example 5.

That is, as described in Example 1, in a state in which common recording operation is performed where the viewer leaves the front of the television receiver for a period for which the broadcasting signal is received by the first tuner unit 111 and the control unit 18 makes the time shift function invalid (state of step S13 of FIG. 3), the control unit 18 always monitoring whether the face image detecting signal has been received from the individual authentication unit 26 (step S14). Further, if the face image detecting signal is received (if determined as Yes in step S14), the control unit 18 compares features of the face image photographed by the camera unit 25 with features of the face image of the specific person stored in the internal memory, determines whether the returned person is the same person as the first person (step S15). Next, if it is determined that the returned person is the same person as the first person (if determined as Yes in step S15), the following processes are the same as the processes corresponding to steps after step S16 including the process of step S16 according to Example 1.

In contrast, if determined as No in step S15, that is, if the returned person is different from the first person, the control unit 18 notifies the viewer that the automatic recording is being performed (step S19-1), and the recording state maintained by this time (that is recording state of the broadcasting signal received by the first tuner unit 111) is continuously maintained. After that, the control unit 18 switches the output switching unit 113 so as to be switched to the second tuner unit 112, and notifies the returned person (a person different from the first person) that the viewer can watch the television (step S19-2). Thereby, even in a case in which the automatic recording according to the embodiment of the invention is executing, a person different from the first person can watch the television. In addition, even in a case in which the first person is returned, since the recording is continued as it is, the first person can watch the missed scene through manual operation.

Example 6

Figure 12:
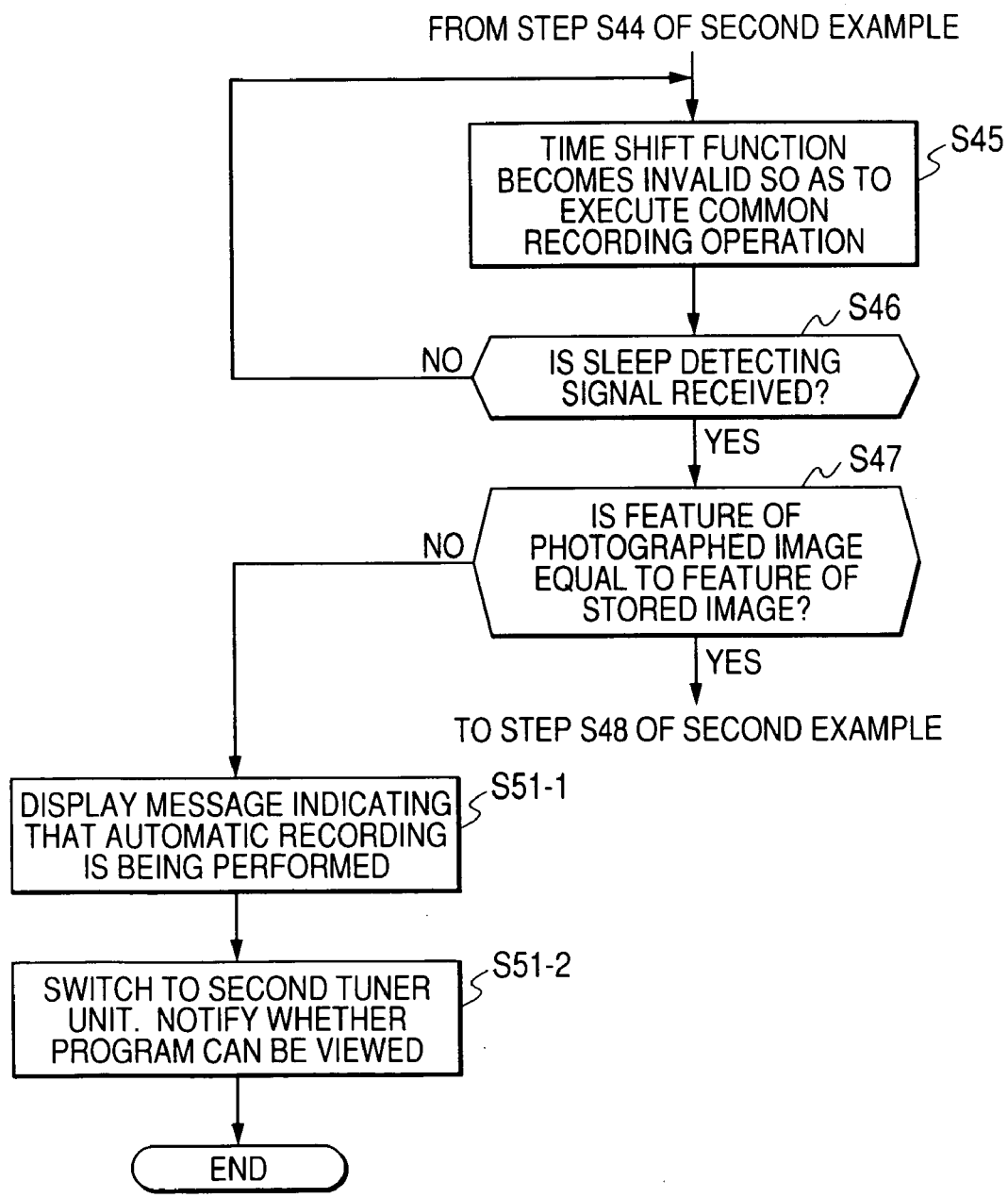
FIG. 12 is a flowchart illustrating an automatic recording reproducing process according to Example 6.

Example 6 corresponds to a modification of Example 2. FIG. 12 is a flowchart illustrating an automatic recording reproducing process according to Example 6. However, FIG. 12 illustrates only a main body of Example 6.

That is, as described in Example 2, in a state in which the common recording operation is performed where the viewer is sleeping for a period for which the broadcasting signal is being received by the first tuner unit 111 and the control unit 18 makes the time shift function invalid (state of step S45 of FIG. 5), the control unit 18 always monitors whether the sleep detecting signal has been received from the individual authentication unit 26 (step S46). Further, if the sleep detecting signal is received (if determined as Yes in step S46), the control unit 18 compares features of the face image photographed by the camera unit 25 with features of the face image of the specific person stored in the internal memory, determines whether the returned person is the same person as the first person (step S47). Next, if it is determined that the returned person is the same person as the first person (if determined as Yes in step S47), the following processes are the same as the processes corresponding to steps after step S48 including the process of step S48 according to Example 2.

In contrast, if determined as No in step S47, that is, if the returned person is different from the first person, the control unit 18 notifies the viewer that the automatic recording is being performed (step S51-1), and the recording state maintained by this time (that is, the recording state of the broadcasting signal received by the first tuner unit 111) is continuously maintained. After that, the control unit 18 switches the output switching unit 113 so as to be switched to the second tuner unit 112, and notifies the returned person (person different from the first person) that the viewer can watch the television (step S51-2). Thereby, even in a case in which the automatic recording according to the embodiment of the invention is executing, the person different from the first person can watch the television. In addition, even in a case in which the first person closes his eyes, since the recording is continued, the first person can watch the missed scene through manual operation.

Example 7

Figure 13:
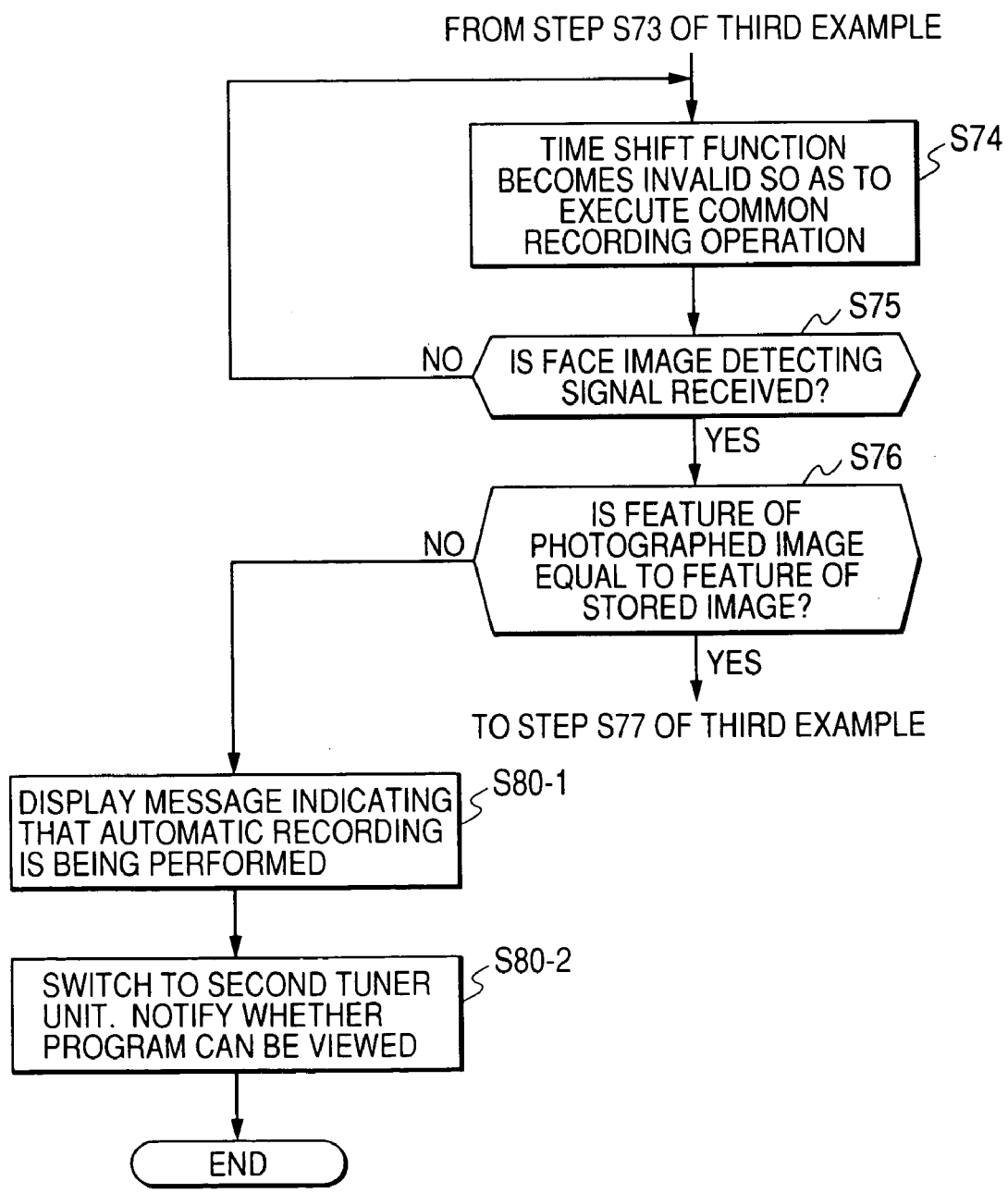
FIG. 13 is a flowchart illustrating an automatic recording reproducing process in a broadcasting signal receiving system according to Example 7.

Example 7 corresponds to a modification of Example 3. FIG. 13 is a flowchart illustrating an automatic recording reproducing process according to Example 7. However, FIG. 13 illustrates only a main body of Example 7.

That is, as described in Example 3, in a state in which common recording operation is performed where the viewer is performing another activity in front of the television receiver for a period for which the broadcasting signal is being received by the first tuner unit 111 and the control unit 18 makes the time shift function invalid (state of step S73 of FIG. 7), the control unit 18 always monitors whether the face image detecting signal has been received from the individual authentication unit 26 (step S75). Further, if the face image detecting signal is received (if determined as Yes in step S75), the control unit 18 compares features of the face image photographed by the camera unit 25 with features of the face image of the specific person stored in the internal memory, and determines whether the returned person is the same person as the first person (step S76). Next, if it is determined that the returned person is the same person as the first person (if determined as Yes in step S76), the following processes are the same as the processes corresponding to steps after step S77 including the process of step S77 according to Example 3.

In contrast, if determined as No in step S76, that is, if the returned person is different from the first person, the control unit 18 notifies the viewer that the automatic recording is being performed (step S80-1), and the recording state maintained by this time (that is, the recording state of the broadcasting signal received by the first tuner unit 111) is continuously maintained. After that, the control unit 18 switches the output switching unit 113 so as to be switched to the second tuner unit 112, and notifies the returned person (person different from the first person) that the viewer can watch the television (step S80-2). Thereby, even in a case in which the automatic recording according to the embodiment of the invention is executing, the person different from the first person can watch the television. In addition, even in a case in which the first person returns to the front of the television, since the recording is continued as it is, the first person can watch the missed scene through manual operation.

Example 8

Figure 14:
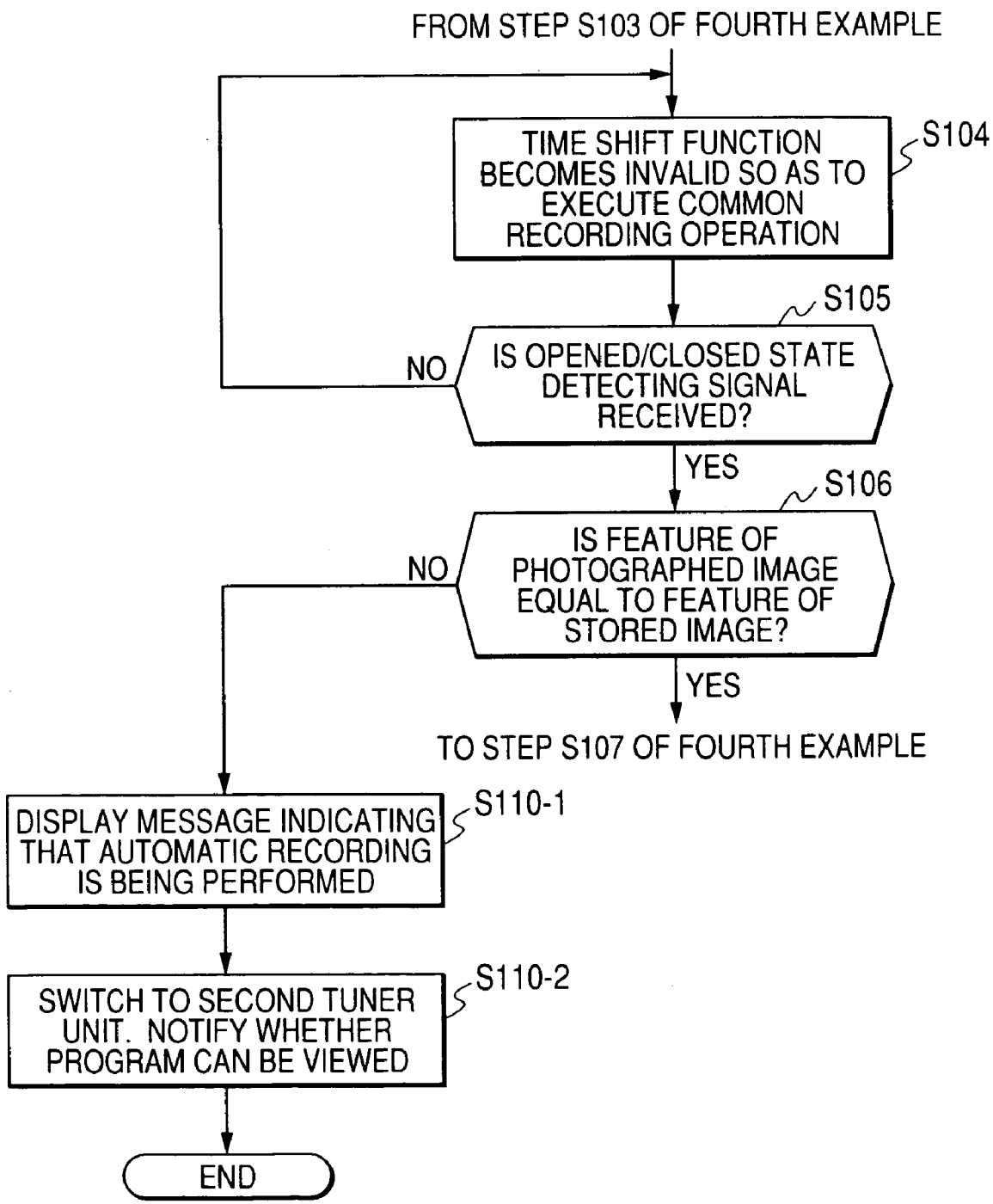
FIG. 14 is a flowchart illustrating an automatic recording reproducing process according to Example 8.

Example 8 corresponds to a modification of Example 4. FIG. 14 is a flowchart illustrating an automatic recording reproducing process according to Example 8. However, FIG. 14 illustrates only a main body of Example 8.

That is, as described in Example 4, in a state in which common recording operation is performed where the viewer is sleeping for a period for which the broadcasting program is being received by the first tuner unit 111 and the control unit 18 makes the time shift function invalid (state of step S104 of FIG. 9), the control unit 18 always monitors whether the opened/closed state detecting signal of the eyes is received from the individual authentication unit 26 (step S105). Further, if the opened/closed state detecting signal of the eyes is received (if determined as Yes in step S105), the control unit 18 compares features of the face image photographed by the camera unit 25 with features of the face image of the specific person stored in the internal memory, and determines whether the returned person is the same person as the first person (step S106). Next, if it is determined that the returned person is the same person as the first person (if determined as Yes in step S106), the following processes are the same as the processes corresponding to steps after step S107 including the process of step S107 according to Example 4.

In contrast, if determined as No in step S106, that is, if the returned person is different from the first person, the control unit 18 notifies the viewer that the automatic recording is being performed (step S110-1), and the recording state maintained by this time (that is, the recording state of the broadcasting signal received by the first tuner unit 111) is continuously maintained. After that, the control unit 18 switches the output switching unit 113 so as to be switched to the second tuner unit 112, and notifies the returned person (person different from the first person) that the viewer can watch the television (step S110-2). Thereby, even in a case in which the automatic recording according to the embodiment of the invention is executing, the person different from the first person can watch the television. In addition, even in a case in which the first person closes his eyes, since the recording is continued, the first person can watch the missed scene through manual operation.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined solely by the following claims and their equivalents.

What is claimed is:

1. A broadcasting signal receiving system comprising:
 a broadcasting signal receiving unit that receives a program broadcasting signal so as to obtain a video signal and an audio signal;
 an image pickup unit that photographs a viewer;
 a face image detecting unit that detects a face image from a photographed image of the viewer photographed by the image pickup unit;
 an authentication unit that compares the face image of the viewer detected by the face image detecting unit with a face image of each individual person registered in advance so as to authenticate the corresponding viewer;
 a recording reproducing unit that records a received program broadcasting signal so as to store the received broadcasting signal;
 a recording reproducing control unit that has a simple recording function for recording a program, which the viewer is viewing, in the recording reproducing unit, and sequentially deletes recorded data of the program in a recorded order whenever a predetermined time lapses,
 wherein when the face image is not detected by the face image detecting unit for a predetermined time or more, the recording reproducing control unit changes an operation mode of the broadcasting signal receiving system from a common mode to a power saving mode at a corresponding time, records a recording position of the corresponding time, and makes the received program continuously recorded by the recording reproducing unit in a state in which the simple recording function becomes invalid such that the face image is detected again by the face image detecting unit, when it is determined that the detected person is the same person as a first person based on the recognition result by the recognition unit, the recording reproducing control unit makes the operation mode of the system return to the common mode from the power saving mode at a corresponding time, and makes the recorded program return to the recording position so as to be reproduced while maintaining the common recording state, in the common recording state in which the simple recording function becomes invalid, when the face image is detected again by the face image detecting unit and it is recognized that the detected person is different from the first person based on the recognition result by the recognition unit, the recording reproducing control unit notifies the viewer that automatic recording is being performed, makes the operation input by a different person invalid, and displays a warning message indicating that the input is invalid on a screen while maintaining the common recording state.

2. A broadcasting signal receiving system comprising:
a broadcasting signal receiving unit that receives a program broadcasting signal so as to obtain a video signal and an audio signal;
an image pickup unit that photographs a viewer;
a face image detecting unit that detects a face image from a photographed image of the viewer photographed by the image pickup unit;
an authentication unit that compares the face image of the viewer detected by the face image detecting unit with a face image of each individual person registered in advance so as to authenticate the corresponding viewer;
a recording reproducing unit that records a received broadcasting signal so as to store the received broadcasting signal;
a recording reproducing control unit that has a simple recording function for recording a program, which the viewer is viewing, in the recording reproducing unit, and sequentially deletes recorded data in a recorded order whenever a predetermined time lapses,
wherein when the face image is not detected by the face image detecting unit for a predetermined time or more, the recording reproducing control unit records a recording position of a corresponding time, makes the receiving program continuously recorded by the recording reproducing unit in a common recording state in which the simple recording function becomes invalid such that the face image is detected again by the face image detecting unit, and
when it is determined that the detected person is the same person as a first person based on the recognition result by the recognition unit, the recording reproducing control unit makes the recorded program return to the recording position so as to be reproduced while maintaining the common recording state.

3. The broadcasting signal receiving system according to claim 2,
wherein when the face image is not detected by the face image detecting unit for a predetermined time or more, the recording reproducing control unit changes an operation mode of the broadcasting signal receiving system from a common mode to a power saving mode at a corresponding time, and
when the face image is detected by the face image detecting unit, the recording reproducing control unit makes the operation mode of the broadcasting signal receiving system return to the common mode from the power saving mode at a corresponding time.

4. The broadcasting signal receiving system according to claim 2, further comprising:
a notification unit that notifies the viewer that automatic recording is being performed, when the face image is detected again by the face image detecting unit and it is recognized that the detected person is the same person as the first person based on the recognition result by the recognition result in the common recording state in which the simple recording function becomes invalid.

5. The broadcasting signal receiving system according to claim 2,
wherein in a common recording state in which the simple recording function becomes invalid, when the face image is detected again by the face image detecting unit and it is recognized that the detected person is different from the first person based on the recognition result by the recognition unit, the recording reproducing control unit makes operation input by the different person invalid and displays a warning message indicating that the input is invalid on a screen while maintaining the common recording state.

6. The broadcasting signal receiving system according to claim 2,
wherein a plurality of the broadcasting signal receiving units are provided,
in a common recording state in which the simple recording function becomes invalid, when the face image is detected again by the face image detecting unit and it is recognized that the detected person is different from the first person based on the recognition result by the recognition unit, the recording reproducing control unit makes a broadcasting signal of a program selected by a different person received by another broadcasting signal receiving unit while maintaining the common recording state so as to be watched by the viewer.

7. A broadcasting signal receiving system comprising:
a broadcasting signal receiving unit that receives a program broadcasting signal so as to obtain a video signal and an audio signal;
an image pickup unit that photographs a viewer;
a face image detecting unit that detects a face image from a photographed image of the viewer photographed by the image pickup unit;
an authentication unit that compares the face image of the viewer detected by the face image detecting unit with a face image of each individual person registered in advance so as to authenticate the corresponding viewer;
a recording reproducing unit that records a received broadcasting signal so as to store the received broadcasting signal;
a recording reproducing control unit that has a simple recording function for recording a program, which the viewer is viewing, in the recording reproducing unit, and sequentially deletes recorded data in a recorded order whenever a predetermined time lapses, and
a dynamic subject determining unit that determines whether a dynamic subject exists from the photographed image of the viewer photographed by the image pickup unit,
wherein when it is determined by the dynamic subject determining unit that the dynamic subject exists and it is determined by the face image detecting unit that the face image cannot be detected, the recording reproducing control unit makes a receiving program continuously recorded by the recording reproducing unit in the common recording state in which a simple recording function becomes invalid, and notifies the viewer that the recording is being performed in the common recording state.

8. A broadcasting signal receiving system comprising:
a broadcasting signal receiving unit that receives a program broadcasting signal so as to obtain a video signal and an audio signal;
an image pickup unit that photographs a viewer;
a face image detecting unit that detects a face image from a photographed image of the viewer photographed by the image pickup unit;
an authentication unit that compares the face image of the viewer detected by the face image detecting unit with a face image of each individual person registered in advance so as to authenticate the corresponding viewer;
a recording reproducing unit that records a received broadcasting signal so as to store the received broadcasting signal;
a recording reproducing control unit that has a simple recording function for recording a program, which the viewer is viewing, in the recording reproducing unit, and sequentially deletes recorded data in a recorded order whenever a predetermined time lapses, and
an opened/closed state determining unit that determines whether eyes are opened or closed from the face image detected by the face image detecting unit,
wherein when it is determined by the opened/closed state determining unit that the eyes are closed for a predetermined time or more, the recording reproducing control unit records a recording position of a corresponding time, makes a receiving program continuously recorded by the recording reproducing unit in a common recording state in which the simple recording function becomes invalid, and
when it is determined by the opened/closed state determining unit that the eyes are opened again, and it is determined that the detected person is the same person as the first person from the recognized result by the recognition unit, the recording reproducing control unit makes the recorded program return to the recording position so as to be reproduced while maintaining the common recording state.

9. The broadcasting signal receiving system according to claim 8,
wherein when it is determined by the opened/closed state determining unit that the eyes are closed for a predetermined time or more, the recording reproducing control unit changes an operation mode of the broadcasting signal receiving system from a common mode to a power saving mode at a corresponding time, and
when it is determined by the opened/closed state determining unit that the eyes are opened again, the recording reproducing control unit makes an operation mode of the broadcasting signal receiving system return to the common mode from the power saving mode at a corresponding time.

10. The broadcasting signal receiving system according to claim 8, further comprising:
a notification unit that notifies the viewer that the program is automatically recording, when it is determined that the eyes are opened again by the opened/closed state determining unit and it is recognized that the detected person is different from the first person based on the recognition result by the recognition unit in a common recording state in which the simple recording function becomes invalid.

11. The broadcasting signal receiving system according to claim 8,
wherein in a common recording state in which the simple recording function becomes invalid, when it is determined by the opened/closed state determining unit that the eyes are opened again and it is determined that the detected person is different from the first person based on the recognition result of the recognition unit, the recording reproducing control unit makes operation input by the different person invalid and displays a warning message indicating that the input is invalid on a screen while maintaining the common recording state.

12. The broadcasting signal receiving system according to claim 8,
wherein a plurality of the broadcasting signal receiving units are provided,
in a common recording state in which the simple recording function becomes invalid, when it is determined by the opened/closed state determining unit that the eyes are opened again and it is recognized that the detected person is different from the first person based on the recognition result by the recognition unit, the recording reproducing control unit makes a broadcasting signal of a program selected by a different person received by another broadcasting signal receiving unit while maintaining the common recording state so as to be watched by the viewer.

13. A broadcasting signal receiving system comprising:
a broadcasting signal receiving unit that receives a program broadcasting signal so as to obtain a video signal and an audio signal;
an image pickup unit that photographs a viewer;
a face image detecting unit that detects a face image from a photographed image of the viewer photographed by the image pickup unit;
an authentication unit that compares the face image of the viewer detected by the face image detecting unit with a face image of each individual person registered in advance so as to authenticate the corresponding viewer;
a recording reproducing unit that records a received broadcasting signal so as to store the received broadcasting signal;
a recording reproducing control unit that has a simple recording function for recording a program, which the viewer is viewing, in the recording reproducing unit, and sequentially deletes recorded data in a recorded order whenever a predetermined time lapses, and
an opened/closed state determining unit that determines whether eyes are opened or closed from the face image detected by the face image detecting unit,
wherein when it is determined that the face image is detected by the face image detecting unit and it cannot be determined by the opened/closed state detecting unit whether the eyes are opened or closed, the recording reproducing control unit makes a receiving program continuously recorded by the recording reproducing unit in a common recording state in which the simple recording function becomes invalid, and notifies the viewer that the recording is being performed in the common recording state.

* * * * *